US007685160B2

(12) United States Patent
Horvitz et al.

(10) Patent No.: US 7,685,160 B2
(45) Date of Patent: Mar. 23, 2010

(54) SYSTEM AND METHODS FOR CONSTRUCTING PERSONALIZED CONTEXT-SENSITIVE PORTAL PAGES OR VIEWS BY ANALYZING PATTERNS OF USERS' INFORMATION ACCESS ACTIVITIES

(75) Inventors: Eric Horvitz, Kirkland, WA (US); Corin Ross Anderson, Tukwila, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 11/191,118

(22) Filed: Jul. 27, 2005

(65) Prior Publication Data

US 2006/0004763 A1   Jan. 5, 2006

Related U.S. Application Data

(62) Division of application No. 10/115,655, filed on Apr. 4, 2002, now Pat. No. 7,203,909.

(51) Int. Cl.
G06F 17/00 (2006.01)
(52) U.S. Cl. .................................. 707/104.1
(58) Field of Classification Search ...................... 707/2, 707/3, 4, 5, 6, 104.1
See application file for complete search history.

(56) References Cited

U.S. PATENT DOCUMENTS

| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |

(Continued)

FOREIGN PATENT DOCUMENTS

WO   9729414   8/1997

(Continued)

OTHER PUBLICATIONS

T. Joachims, Text categorization with support vector machines: learning with many relevant features, Machine Learning, European Conference on Machine Learning, Apr. 21, 1998, pp. 137-142.

(Continued)

*Primary Examiner*—Don Wong
*Assistant Examiner*—Thanh-Ha Dang
(74) *Attorney, Agent, or Firm*—Lee & Hayes, PLLC

(57) ABSTRACT

The present invention relates to a system and methodology to assist users with data access activities and that includes such activities as routine web browsing and/or data access applications. A coalesced display or montage of aggregated information is provided that is focused from a plurality of sources to achieve substantially one-button access to user's desired web or data source information/destinations in order to mitigate efforts in retrieving and viewing such information. Past web or other type data access patterns can be mined to predict future browsing sites or desired access locations. A system is provided that builds personalized web portals for associated users based on models mined from past data access patterns. The portals can provide links to web resources as well as embed content from distal (remote) pages or sites producing a montage of web or other type data content. Automated topic classification is employed to create multiple topic-centric views that can be invoked by a user.

10 Claims, 19 Drawing Sheets

U.S. PATENT DOCUMENTS

| | | | |
|---|---|---|---|
| 5,611,050 A | 3/1997 | Theimer et al. | |
| 5,617,539 A * | 4/1997 | Ludwig et al. | 709/205 |
| 5,619,709 A | 4/1997 | Caid et al. | |
| 5,649,186 A * | 7/1997 | Ferguson | 707/10 |
| 5,727,129 A | 3/1998 | Barrett et al. | |
| 5,740,549 A * | 4/1998 | Reilly et al. | 705/14 |
| 5,758,257 A | 5/1998 | Herz et al. | |
| 5,778,187 A | 7/1998 | Monteiro et al. | |
| 5,812,865 A | 9/1998 | Theimer et al. | |
| 5,835,087 A | 11/1998 | Herz et al. | |
| 5,862,223 A * | 1/1999 | Walker et al. | 705/50 |
| 5,877,758 A | 3/1999 | Seybold | |
| 5,884,035 A * | 3/1999 | Butman et al. | 709/218 |
| 5,931,907 A * | 8/1999 | Davies et al. | 709/218 |
| 5,973,683 A | 10/1999 | Cragun et al. | |
| 6,004,138 A | 12/1999 | Harbertson | |
| 6,018,619 A * | 1/2000 | Allard et al. | 709/224 |
| 6,023,714 A | 2/2000 | Hill et al. | |
| 6,041,311 A * | 3/2000 | Chislenko et al. | 705/27 |
| 6,085,226 A | 7/2000 | Horvitz | |
| 6,092,049 A * | 7/2000 | Chislenko et al. | 705/10 |
| 6,112,186 A * | 8/2000 | Bergh et al. | 705/10 |
| 6,119,135 A | 9/2000 | Helfman | |
| 6,230,185 B1 * | 5/2001 | Salas et al. | 709/205 |
| 6,236,978 B1 * | 5/2001 | Tuzhilin | 705/26 |
| 6,236,987 B1 | 5/2001 | Horowitz et al. | |
| 6,275,858 B1 | 8/2001 | Bates et al. | |
| 6,310,601 B1 | 10/2001 | Moore et al. | |
| 6,336,134 B1 * | 1/2002 | Varma | 709/205 |
| 6,338,086 B1 * | 1/2002 | Curtis et al. | 709/218 |
| 6,405,195 B1 * | 6/2002 | Ahlberg | 707/4 |
| 6,438,579 B1 * | 8/2002 | Hosken | 709/203 |
| 6,466,232 B1 | 10/2002 | Newell et al. | |
| 6,487,390 B1 | 11/2002 | Virine et al. | |
| 6,507,865 B1 * | 1/2003 | Hanson et al. | 705/36 R |
| 6,513,046 B1 | 1/2003 | Abbott, III et al. | |
| 6,549,915 B2 | 4/2003 | Abbott, III et al. | |
| 6,604,138 B1 | 8/2003 | Virine et al. | |
| 6,625,624 B1 | 9/2003 | Chen et al. | |
| 6,631,496 B1 | 10/2003 | Li et al. | |
| 6,638,315 B2 | 10/2003 | Uppiano et al. | |
| 6,650,433 B1 | 11/2003 | Keane et al. | |
| 6,675,159 B1 | 1/2004 | Lin et al. | |
| 6,675,350 B1 | 1/2004 | Abrams et al. | |
| 6,681,247 B1 * | 1/2004 | Payton | 709/217 |
| 6,735,632 B1 | 5/2004 | Kiraly et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,801,909 B2 * | 10/2004 | Delgado et al. | 707/4 |
| 6,810,404 B1 * | 10/2004 | Ferguson et al. | 707/200 |
| 6,812,937 B1 | 11/2004 | Abbott et al. | |
| 6,832,350 B1 | 12/2004 | Bates et al. | |
| 6,842,877 B2 | 1/2005 | Robarts et al. | |
| 6,845,374 B1 | 1/2005 | Oliver et al. | |
| 6,901,553 B1 | 5/2005 | Hayashi et al. | |
| 6,912,573 B2 * | 6/2005 | Ohkado et al. | 709/224 |
| 6,957,398 B1 * | 10/2005 | Nayeri | 715/867 |
| 6,965,751 B2 * | 11/2005 | Koga et al. | 434/350 |
| 6,980,993 B2 | 12/2005 | Horvitz | |
| 7,003,792 B1 | 2/2006 | Yuen | |
| 7,062,511 B1 | 6/2006 | Poulsen | |
| 7,113,921 B2 * | 9/2006 | Linker et al. | 705/27 |
| 7,124,360 B1 | 10/2006 | Drenttel et al. | |
| 7,143,357 B1 * | 11/2006 | Snibbe et al. | 715/751 |
| 7,155,508 B2 | 12/2006 | Sankuratripati et al. | |
| 7,162,432 B2 | 1/2007 | Mascarenhas | |
| 7,184,965 B2 * | 2/2007 | Fox et al. | 705/7 |
| 7,225,142 B1 * | 5/2007 | Apte et al. | 705/14 |
| 7,243,156 B2 * | 7/2007 | Hahn et al. | 709/231 |
| 7,266,686 B1 * | 9/2007 | Monteiro et al. | 713/161 |
| 7,290,061 B2 * | 10/2007 | Lentini et al. | 709/246 |
| 7,321,919 B2 * | 1/2008 | Jacobs et al. | 709/205 |
| 7,353,234 B2 | 4/2008 | Kimball et al. | |
| 7,386,831 B2 * | 6/2008 | Flanagan | 717/103 |
| 7,424,671 B2 * | 9/2008 | Elza et al. | 715/234 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0013788 A1 * | 1/2002 | Pennell et al. | 707/507 |
| 2002/0029162 A1 | 3/2002 | Mascarenhas | |
| 2002/0029267 A1 | 3/2002 | Sankuratripati et al. | |
| 2002/0032689 A1 | 3/2002 | Abbott, III et al. | |
| 2002/0042755 A1 * | 4/2002 | Kumar et al. | 705/26 |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0156801 A1 * | 10/2002 | Kitada et al. | 707/500 |
| 2002/0180786 A1 | 12/2002 | Tanner | |
| 2003/0014482 A1 * | 1/2003 | Toyota et al. | 709/203 |
| 2003/0014491 A1 * | 1/2003 | Horvitz et al. | 709/206 |
| 2003/0046401 A1 | 3/2003 | Abbott et al. | |
| 2003/0110255 A1 | 6/2003 | Tarquini et al. | |
| 2003/0154476 A1 | 8/2003 | Abbott, III et al. | |
| 2003/0182394 A1 | 9/2003 | Ryngler et al. | |
| 2004/0001104 A1 | 1/2004 | Sommerer et al. | |
| 2004/0186762 A1 * | 9/2004 | Beaven et al. | 705/8 |
| 2005/0034078 A1 | 2/2005 | Abbott et al. | |
| 2005/0108200 A1 | 5/2005 | Meik et al. | |
| 2006/0004705 A1 | 1/2006 | Horvitz | |
| 2007/0180361 A1 | 8/2007 | Dovin et al. | |
| 2007/0240076 A1 | 10/2007 | Astala et al. | |

FOREIGN PATENT DOCUMENTS

| | | |
|---|---|---|
| WO | 9729414 A2 | 8/1997 |
| WO | 9800787 | 1/1998 |
| WO | WO03005235(A1) | 1/2003 |

OTHER PUBLICATIONS

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36-No. 7.

Roy Want, et al., The Active Badge Location System, ACM Transactions on Information Systems, Jan. 1992, pp. 91-102, vol. 10-No. 1.

Mark Weiser, Some Computer Science Issues in Ubiquitous Computing, Communications of the ACM, Jul. 1993, pp. 75-84, vol. 36-No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8-No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

Eric Schwarzkopf, An Adaptive Web Site for the UM 2001 Conference, 2001.

Steffen Staab, et al. Knowledge Portals—Ontologies at Work, 2001.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 pages.

Robert M. Losee, Jr., Minimizing information overload: the ranking of electronic messages, Journal of Information Science 15, Elsevier Science Publishers B.V., 1989, pp. 179-189.

Eric J. Horvitz, et al., "Utility-based abstraction and categorization." In Proceedings Ninth Conference on Uncertainty in Artificial Intelligence (1993), pp. 128-135.

* cited by examiner

SYSTEM AND METHODS FOR CONSTRUCTING PERSONALIZED CONTEXT-SENSITIVE PORTAL PAGES OR VIEWS BY ANALYZING PATTERNS OF USERS' INFORMATION ACCESS ACTIVITIES

CROSS-REFERENCE TO RELATED APPLICATIONS

This application is a divisional of U.S. patent application Ser. No. 10/115,655, filed on Apr. 4, 2002, and entitled "SYSTEM AND METHODS FOR CONSTRUCTING PERSONALIZED CONTEXT-SENSITIVE PORTAL PAGES OR VIEWS BY ANALYZING PATTERNS OF USERS' INFORMATION ACCESS ACTIVITIES." This application is also related to co-filed, co-pending applications Ser. Nos. 11/190,405, 11/190,690, 11/191,184 and 11/191,119. The entireties of these applications are incorporated herein by reference.

TECHNICAL FIELD

The present invention relates generally to computer systems, and more particularly to a system and methodology applying automated learning to the types of information that users desire to view or access in accordance with different contexts and automatically coalescing the information into a singular place.

BACKGROUND OF THE INVENTION

Despite the exploratory implication of terms such as "browsing" and "surfing," web usage or other types of data acquisition often follow routine patterns of access. For example, a typical user may read a web-based newspaper the first thing in the morning, then spend a few hours on software development, with intermittent consultation of online programming documentation. Following a break at noon for lunch and to read comics or conduct other leisure activity on the web, the user may return to programming, take a mid-afternoon break to check news and possibly read a few more comics, and finally consult online transit information shortly before leaving in the evening. Such stereotypical patterns of web access are common. However, despite the regularity with which users view web or other type information content, few intuitive and/or automated mechanisms exist to assist with these routine tasks. As an example, lists of bookmarks generally must be authored and maintained manually by users and are often presented in a cumbersome hierarchical menu. Links and content on personalized portals (e.g., MSN) can be constructed and are more easily navigable, but still are generally selected and managed by users in an explicit manner.

One such system for managing and navigating web-based information includes an architecture that relies on site descriptions, which are essentially programs that run on a web site (e.g., following links, filling in forms, and so forth) and produce a block of HTML as output, for example. A system employing this concept can enable users to select site descriptions desired on a start page, execute the site descriptions and concatenate the results for display. This approach has several drawbacks however. First, site description architectures generally require manual selection of web content to display, thus causing users to expend time to manually maintain a page. Second, these type architectures often do not provide great insight or views into the actual content that may appear or be available at a remote location (without actual navigation to the site), because the architectures generally only involve filtering web content based on an HTML markup of a remote site or page.

Another similar system provides automatically building bookmark lists. These systems can channel user's browsing through a proxy to log web access patterns. From the logged access patterns, a web directory of the pages each user visits can be built by selecting which pages to include by how often the user visits the pages and by an associated link structure. Still yet another system provides a user-controlled automated system that maintains a hierarchical organization of a user's bookmarks while letting the user control certain aspects (e.g., "freezing" nodes in a node hierarchy to prevent them from being changed). Automatic bookmark systems can reduce the effort required by the user to maintain their bookmark lists, but do not address all the drawbacks of such lists. For example, bookmark lists are generally insensitive to a user's browsing context, and may require substantial user effort to find a target link (e.g., navigating a hierarchical menu structure and/or substantial drilling down through a web directory).

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate automated and dynamic information access while mitigating the amount of time or process to acquire and/or view such information. This goal can be achieved by providing a montage display or collage of information that is automatically aggregated and presented to users as a singular collection of information from a plurality of information sites such as can be aggregated and acquired from a plurality of web pages. The montage can operate as a virtual browser or tool created from dynamically configured lenses that are focused or directed at remote or local information sites of interest to the user, wherein the sites of interest are automatically determined. Lenses provide a geometrically configured portal, clipping and/or information retrieval component that dynamically selects, clips, retrieves and formats portions of information from the automatically determined sites of interest. It is noted that the present invention is not limited to web or browser type displays, wherein other aspects can include peripheral and/or ambient displays (e.g., sidebars, help panes, displays running in conjunction with other applications, and so forth).

A predictive component is provided that facilitates automatic determination of the sites based upon a probabilistic model of the sites' information value to a user, wherein the model can be constructed from log files that record previous user activity or previous site access patterns in conjunction with an associated context in which the user activity occurs. Information value can be determined from past evidence such as frequency of site access and the associated context in which sites are accessed such as a time of day and related calendar information, for example. Furthermore, categorization tools such as Bayesian inference models and text classifiers can be employed to determine information value and topics of interest from the associated log files. This can include the employment of topic-centric segmentation of displays or views based on an automated topic classifier. The topic classifier can be employed for enriching display content, as well as for providing topic-centric pages at layout and view time.

Another aspect of classification and topic analysis relates to dynamic decisions regarding a level of detail per topic area represented. If a plurality of materials are determined in a respective topic area, automatic utilities can be provided to drop lower in an information tree to refine a topic area into more explicit sub-areas or topics, that can include more detailed and/or separate pages for respective topics in the refined area. For example, for a person interested in sports or another topic, building a sports page at a similar level as a news page may not be adequate. Thus, these users may desire basketball, baseball, and football as separate pages, for example, wherein respective pages are provided as a montage focused on the related topic of the page. This aspect can be achieved with a user's assistance and/or automatically by determining users interest in a particular topic or topics and analyzing a topic ontology to provide separate and/or more focused pages.

In conjunction with the predictive component described above, a utility model can be employed that facilitates site selection and layout of the montage based upon such factors as the context, interest in a page, and/or navigation savings provided to the user by placing selected information content within the domain or display of the montage. In another aspect, collaborative models can be constructed from a plurality of users' access patterns belonging to a group or association, wherein the montage can be provided and displayed not according to a particular user's access patterns, but to how similar members of the group have previously sought to acquire information. As an example, a new employee montage could be provided to new employees that includes quick links and/or embedded content relating to information learned and sought by previous newly hired employees (e.g., montage providing links or information of benefits, vacation, work policies, location maps and so forth based on previous access patterns of new employees).

After the montage has been constructed, users can navigate to the automatically determined sites of interest that are displayed on the montage via a single or reduced number of selection options (e.g., selection of desired URL from montage display via single key stroke). This mitigates the amount of time users navigate to desired sites of interest by reducing the amount of time a user may be required to drill-down, search and/or navigate to a desired site in contrast to conventional systems. Moreover, the montage can be configured as a collection of desired sites and/or be configured to provide selected embedded information content via the lenses. This can further reduce navigation costs by directly presenting desired information that has been clipped or selected into the display of the montage without having to actually visit such sites to retrieve or view the desired information.

A graphical user interface is also provided in accordance with the present invention that provides multidimensional display characteristics for presenting montage information (e.g., N-dimensional displays, 2D, 3D and so forth). This includes providing users with a plurality of controls for adjusting and/or configuring the montage according to personal tastes. The controls can include such aspects as adjusting or configuring the lenses and/or the montage display to alter how an amount of data and/or presentation area for information is displayed and to control such aspects as refresh characteristics of one or more portions of the montage display (e.g., how often is a selected portion of the montage display updated from the remote site). In addition, if a site is selected from an initial montage display offering of embedded content or selected links of interest, a sub-montage can be configured from a predictive component and associated utility model that is refined and directed to characteristics of the selected site (e.g., a sports topic selected from a montage of general topics of interest by the user, a subset or nested montage is then constructed and presented from areas of baseball, football, basketball and golf patterned on past access and context related to sports of interest to this particular user).

In accordance with one aspect of the present invention, a web montage is provided that includes methods for inference of desired topics of interest, wherein a user interface is provided for display and control of the montage. This can include employment of expected utility models for laying out and/or displaying the montage. The user interface can include controls of size and position of lensing options, via a "clipping" window associated with automatically determined web content and then persisting information from the clipping window onto personalized windows—locally or on server, for example.

Automated layout and prioritization of displayed montage content can be based on an analysis of information value to a user and include navigation savings (e.g., by importance, utility, size, knapsack, box-filling approach, and so forth) for displayed content and for associated topics of interest. This includes automated categorization for layouts such as provided by a classification model, and can include specialized, focused pages conditioned on the user's current context. In addition, predictive models can be employed for a single user and/or in collaborative applications (e.g., links that might be viewed by members of a group and consider the amount of time since belonging to the group). The user interface also enables users to specify how much they value content versus navigation savings, for example, and to specify how to capture personal measures of interestingness or value of information. Moreover, the user interface can provide for selectively controlling how often content within associated montage clippings can be refreshed, with defaults that can be based on information type, page type, topic and/or combinations thereof.

In accordance with another aspect of the present invention, predictive models are determined from past activities of users or groups for determining desired content to display on the montage. This can include predictions based on such information or evidence such as time and patterns of data access, for example. Predictions can also consider evidence such as recent and/or current context. Such context can include such aspects as: time of day, day of week, period of time since last reviewed, recent or current application usage, use of patterns of and/or statistics on a topic of information (web, other database) accessed for some time horizon before a start page is examined, and/or information that is currently being accessed. Another aspect includes utilization of timing information as a determinant of non-content steps in a utility model for assisting users with links to maximize ease of access to desired sites and include systems that observe what a specific user is doing and building a set of links based on that user's activity. As described above, predictive models can be employed in collaborative filtering applications, in addition to learning patterns of routine browsing and associated displays related to a single user.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
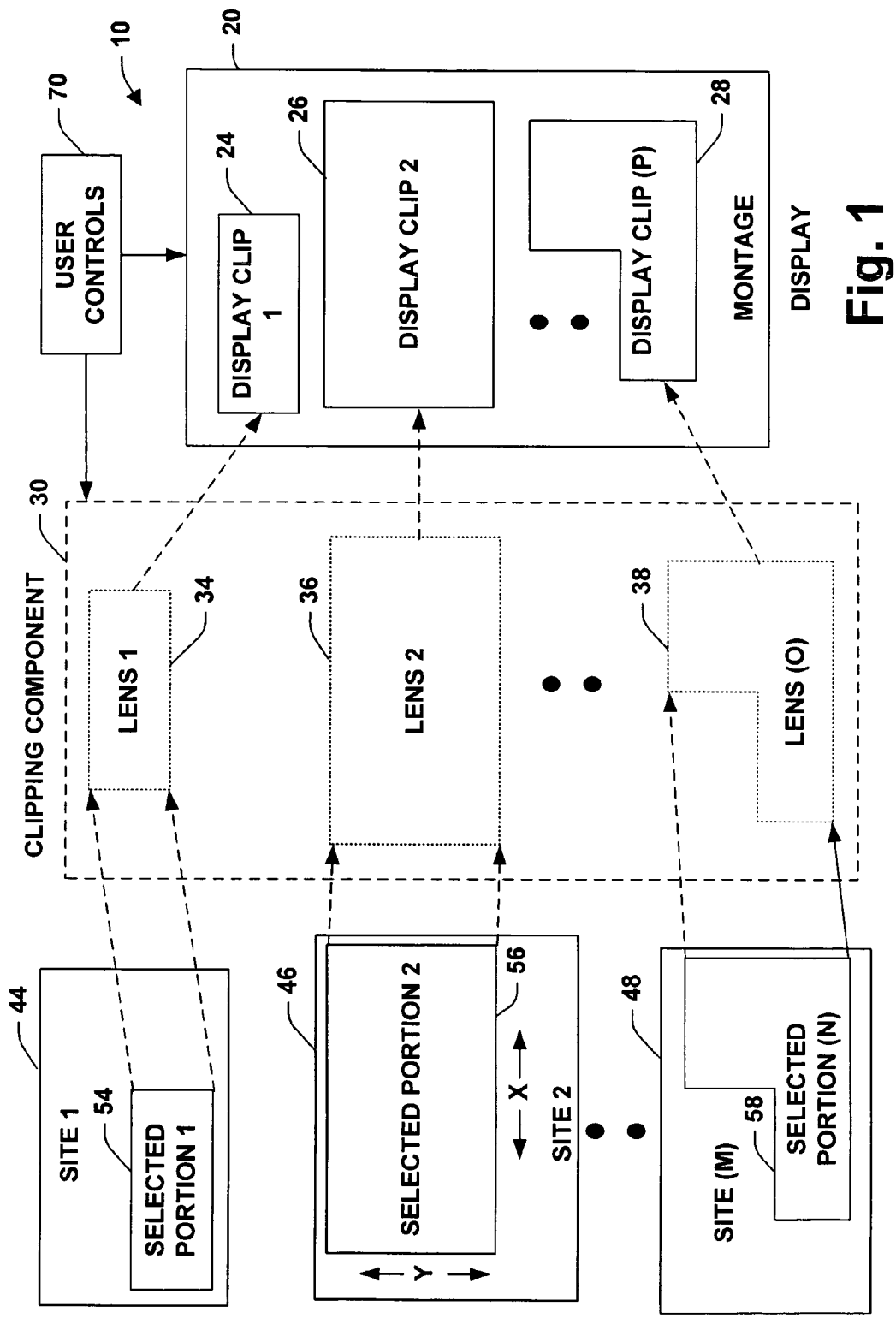
FIG. 1 is a schematic block diagram illustrating a montage system and user interface in accordance with an aspect of the present invention.

In general, it has been observed that substantially not all web usage or database access is random or novel in nature. Thus, web users tend to revisit sites and pages in a regular, predictable manner. In many instances, which sites or information stores are visited and viewed can depend substantially on a user's current context, wherein one aspect of context can be taken as the time of day and the general topic of pages or sites that have been viewed previously. More generally, context as applied to a web browsing session can be defined as a set of attributes that influence (either consciously or subconsciously) a selection of pages or topics to view in a subsequent session.

Many factors can be included in a formalization of context. For instance, the context can include a time of day, a period of time elapsed since a last session ended, the general topic of the last session, a most recent non-browsing computer activity (e.g., the most recently viewed e-mail message) and so forth. Routine web browsing can generally be defined as an overall pattern of web or data content access that a user performs whenever in the same or similar contexts. For example, if a user reviews his stock portfolio at around 1:15 p.m. every day, then viewing the stock portfolio can be modeled as a routine behavior because it happens at about the same time each day. On the other hand, if the user employs a one-time session to search for information about a selected topic, then this behavior may not be considered routine because the user may not repeat this search in a similar context.

The present invention relates to a system and methodology to assist users with data access activities and that includes such activities as routine web browsing and/or data access applications. As described above, routine web browsing can apply to patterns of web content or other data type access that users tend to repeat on a relatively regular and predictable basis (e.g., pages viewed at about the same time each day, in the same sequence, when working on the same task, and so forth).

The present invention provides a coalesced display or montage of aggregated information that is focused from a plurality of sources to achieve substantially one-button access (or less) to users' desired web or data source information/destinations in order to mitigate efforts in retrieving and viewing such information. Tools for web browsing such as a user interface display are enhanced by tailoring links and associated views to a user's current browsing context in contrast to conventionally displaying a static set of content under substantially all circumstances. As will be described in more detail below, past web or other type data access patterns can be mined to predict future browsing sites or desired access locations. Thus, a system can be provided that builds personalized web portals for associated users, based on models mined from users' past usage or data access patterns. These portals can provide links to web resources as well as embed content from distal (remote) pages or sites, thus producing a montage of web or other type data content.

Referring initially to FIG. 1, a system 10 illustrates an automatically generated montage in accordance with an aspect of the present invention. A montage can be automatically constructed and dynamically updated as a page (e.g., page in a web browser) in order to provide a "one-stop" location for users to access or retrieve information of interest. The montage can be generated on a graphical display 20 having one or more display objects (not shown) and be provided as part of a graphical user interface, wherein the display 20 can include 1 to P display clippings 24-28 (P being an integer). The display clippings provide information of interest relating to a user in substantially any format or dimension, whereby a currently generated/displayed montage is a combination of clippings 24-28 associated with a current context of a user. For example, a current context of a user can be related to a time, day of the week, date and/or other period/factor described below, whereby the user is likely to have an interest in the displayed clippings 24-28 based upon past data access activities in similar contexts.

The montage can combine content from many different pages or data sites including linking to pages and/or embedding distal site content—potentially saving the user time to follow even a single link to view the content. The montage can also be assembled automatically to fit within the user's current browser window, for example, to mitigate the need to scroll or subsequently search through data or pages. In addition to a web start, browser, and/or portal display, other type displays can include views that operate in conjunction with applications, operate as a background task, and/or as a complement to other activities a user. This can include ambient, iconic and/or peripheral type displays such as in a sidebar to another display or application.

As will be described in more detail below (See e.g., FIG. 3), a user's past history of data site access can be recorded in a log along with an associated context. The log can be mined to construct a model to predict future sites of interest to the user based on the user's current context. Based on the predictions derived from the model and current context data, the lens components 34-38 can be configured to format a montage display of predicted areas or topics of interest. It is also noted that data mining can occur in a collaborative sense—derived from a plurality of users in order to construct models for members of groups or associations and is also described in more detail below.

A clipping component 30 is provided to update the display 20 and associated clippings 24-28 from information received via lenses 1 though O (reference numerals 34-38), from local or remote web and/or data sites 1 through M (reference numerals 44-48), M and O being integers. The lenses 34 through 38 are adapted as a portal having address and/or coordinate information to focus/retrieve 1 through N selected portions of information 54-58 onto the display 20, N being an integer. For example, the lenses 34-38 can contain Universal Resource Locators (URL) of the sites 44-48 (or other pointer/ address to a data site) and include coordinate or other type information associated with a screen or data location of the selected portions 54-58. As one particular example, Site$_2$ at reference 46 illustrates how X and Y coordinates are employed to clip the selected portion at reference 56 via the lens$_2$ at reference 36.

It is to be appreciated that the present invention can employ substantially any coordinate system, including multidimensional coordinate systems, and employ substantially any display format for the display clippings 24-28, wherein the display format (provided in the clipping component and associated lenses) can include substantially any shape, color, dimension, code format—including embedded executables, and include combinations of these and other respective formats or attributes. It is also to be appreciated that fewer lenses 34-38 can be employed, wherein a given lens, after updating one portion of the display 20 can be refocused onto a subsequent site 44-48 to update a different portion of the display. In addition, information retrieved from a respective lens 34-38 can be directed to substantially any portion of the display 20 regardless of any apparent display orderings depicted in the system 10. A plurality of alternative display formats will be described in more detail below. It is noted that display content can be transformed as it is placed on the montage. For example, the content could be scaled in a smaller manner such as generating an iconic representation of the distal content.

As part of the graphical user interface described above in association with the display 20, user controls 70 can be provided as part of and/or in association with the display. The display 20 can be configured via the user controls 70 to provide feedback and outputs regarding various aspects of display or content preferences, configurations and/or desired information formatting by the user. The display 20 and/or user controls 70 can include display objects (e.g., icons, buttons, sliders, input boxes, selection options, menus, tabs, clipping displays, and so forth) having multiple dimensions, shapes, colors, text, data and sounds to facilitate optimal control, sizing/resizing, format and/or display of the montage. This can include such aspects as dimensioning the display clippings, providing feedback regarding displayed content or models, and controlling clipping refresh rates which are described in more detail below. In addition, various menus and alternative screens or display outputs can be provided that perform a plurality of aspects of the present invention. The display 20 and/or user controls 70 can also include a plurality of inputs for adjusting and configuring one or more aspects of the present invention. This can include receiving user commands from a mouse, keyboard, speech input and/or other device to effect operations of the display 20, associated graphical user interface and/or associated montage.

Figure 2:
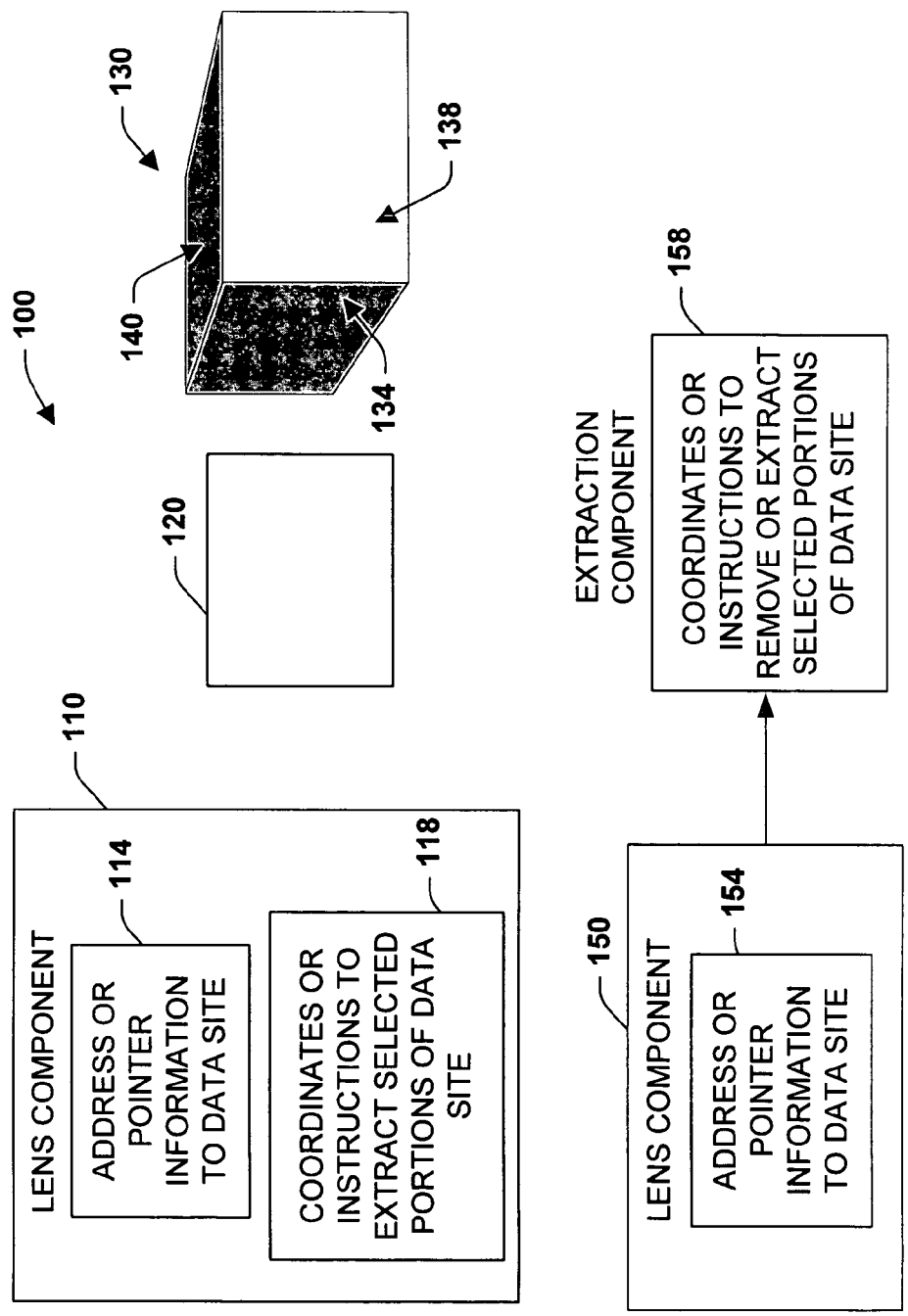
FIG. 2 is a diagram illustrating a lens component in accordance with an aspect of the present invention.

Turning now to FIG. 2, a system 100 illustrates possible lens configurations in accordance with an aspect of the present invention. One possible lens is illustrated at 110. The lens 110 is configured as a portal to focus or retrieve data from selected portions of local or remote sites and subsequently display/format the data in the form of a montage, collage and/or other collection of data, links and/or topics of interest. The lens 110 includes an address or pointer component 114 that directs the lens component to a desired site and associated data. For example, the address component 114 can include an explicit or indirect address (e.g., explicit network or Ethernet address) to a data site or provide a web location such as a URL. An extraction component 118 can be included in the lens component that contains coordinate or instruction information (e.g., streaming commands, executables, formatting instructions, size/cropping specifications) to extract selected portions of site data pointed to by the address component 114. As an example, the extraction component 118 can include instructions or coordinates pertaining to a particular location on or within a web page or data store in which to extract data. An example method for extracting and displaying selected portions of data will be described in more detail below in relation to FIGS. 7-9.

After selected data has been extracted from a data site or web page via the lens component 110, the data can be placed into a selected clipping such as illustrated in an exemplary clipping or display segment at 120. It is noted that additional components can be provided as part of the lens or user interface to supply formatting instructions and/or rules in which to display the clipping or display segment. The clipping segment 120 is depicted as a two-dimensional component (e.g., rectangle), however, it is to be appreciated that a plurality of other shapes are possible (e.g., squares, triangles, circles, ellipses, trapezoids, and user-defined shapes such as can be drawn with a drawing tool). In addition, three or higher dimensional shapes such as illustrated at 130 can be constructed (e.g., cubes, polygons, spheres, ellipsoids, pyramids, N-dimensional shapes, and combinations thereof). For example, a cubic shape 130 is illustrated having six sides.

The shape 130 can be filled from one or more lenses 110 that are focused on one or more data sites. For example, a first lens 110 can output data to a side 134, a second lens (not shown) can output data to a side 138, a third lens (not shown) can fill a third side 140 and so forth. Furthermore, a single lens 110 or more can be directed to multiple sites in sequence via the address component 114, wherein a selected site is read for selected data, a portion of the shape 130 is updated or refreshed, then a subsequent portion of the shape is updated from a subsequent redirection of the lens 110 via the address component and so forth. In addition, the clipping segment 120 and/or higher dimensional shapes 130 can be rotated by user control and/or on a predetermined/periodic basis. For higher dimensional shapes such as 130, rotations can occur along substantially any axis in which the shapes are rendered. It is noted that an alternative lens configuration 150 can be provided. The lens 150 can be pointed at a remote site, wherein substantially all or a greater portion of the data is retrieved from a site or page via an address component 154. The retrieved data can be processed remotely, wherein an extraction component 158 and or formatting component (not shown) can subsequently remove or extract selected portions of data from the larger collection of data retrieved.

Figure 3:
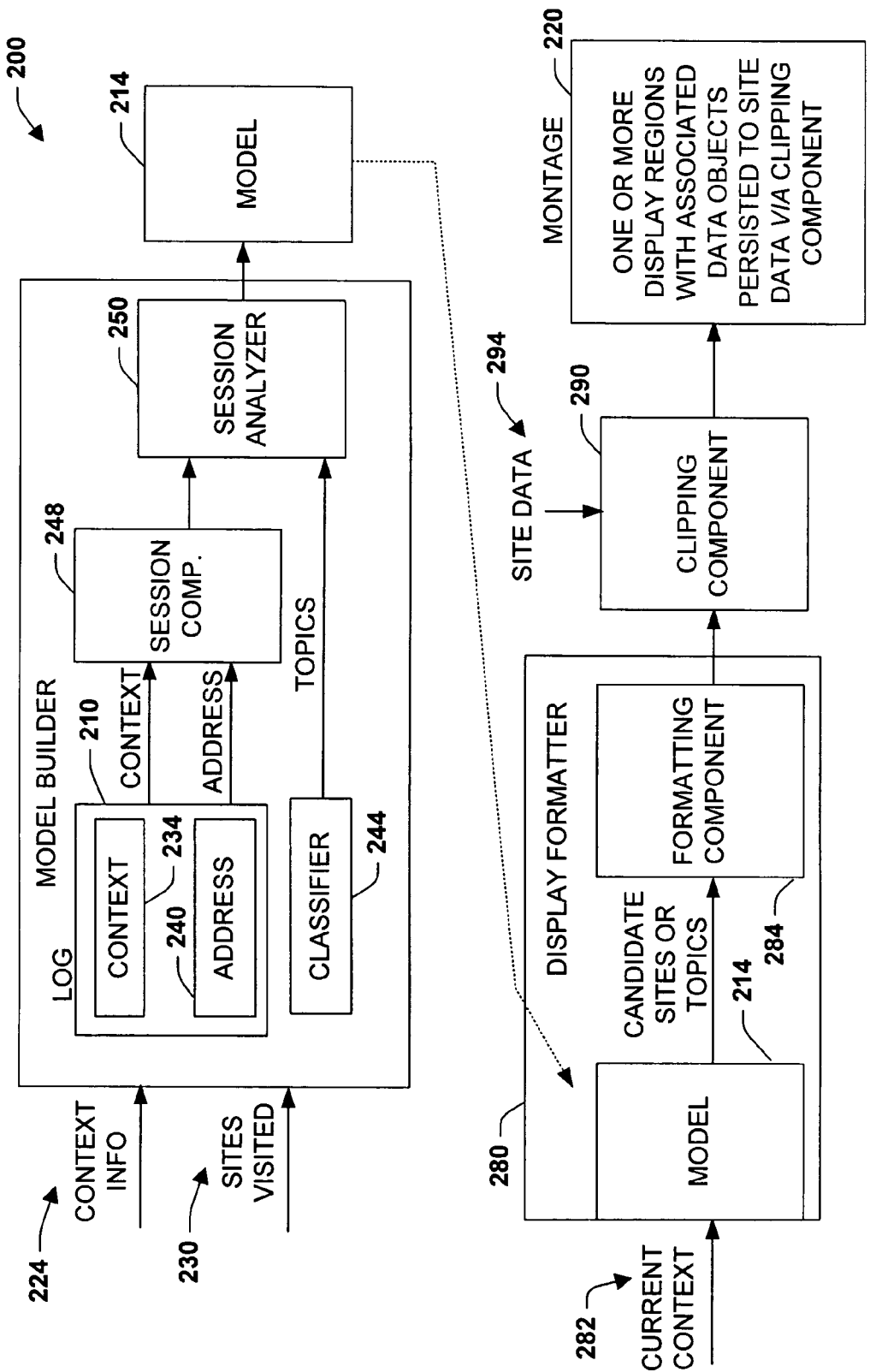
FIG. 3 is a schematic block diagram illustrating a model building architecture and montage system in accordance with an aspect of the present invention.

Referring now to FIG. 3, a system 200 is provided for constructing and displaying a montage in accordance with an aspect of the present invention. The system 200 illustrates a staged process in which to create a model and to build a montage. The system 200 collects and mines web access logs 210 for respective users or as will be described below from a plurality of users in a collaborative setting. From these logs 210, the system 200 builds a model 214 relating to the user in order to calculate a probability that the user will revisit select pages, and to assess the user's level of interest therein. In another process, the system 200 employs the model to calculate an expected utility of displaying respective candidate clippings such as web pages/portions thereof, data locations and/or topics predicted for the user via the model 214, and assembles a montage 220 of the most likely candidates. A portion of the model 214 can be stated as a general probabilistic estimate to determine information value to a user given evidence of the user's interest in a potential site or topic. The estimate can be stated as:

EXAMPLE 1

$$\text{Pr (Information Value} | E_1, E_2, \ldots E_j );$$

wherein Pr is a probability, Information Value relates to an importance of a site or topic to the user given evidence E relating to attributes of importance, and J being an integer. As will be described below, probability models such as Bayesian inference models can be employed.

The primary source of the information for the user model 214 can be a sequence of pages 224 or sites the user has requested. Sequences can be captured in the log 210 by recording context information 230 such as a time and date of respective pages 224 visited via a recording in a context store 234, recording a URL or other locator in an address store 240, and determining an associated topic via a classifier 244. The most likely topic of the page can be determined employing a text classification analysis that considers a web topic ontology, for example. It is noted that the classifier 244 can be provided via a plurality of automatic classification techniques. For example, such techniques can include Support Vector Machines (SVM), Naive Bayes, Bayes Net, decision tree, similarity-based, vector-based, and/or other learning models or combinations thereof. The classifier 244 can be stated as a function that maps an input attribute to the confidence that the input belongs to a class. In the case of topic classification, attributes can be words appearing in a page or site or other domain-specific attributes derived from the words.

A result of the data stored in the log 210 and topic classification is a sequence of requests that is further refined into sessions via a session component 248, wherein a session can be defined as a sequence of page requests. A session begins with a visit to a user's start page that can be the first page in a browser display, or a page visited when the user clicks a "home" button at the browser (not shown). Generally, it can be difficult to determine which page is the start page and, thus, heuristics can be employed to identify when one session ends and when a subsequent session begins. A session analyzer 250 employs the page sequences and/or sessions from the session component 248 to compute various aspects about the user for the model 214 and can include evidence E of information value.

Figure 4:
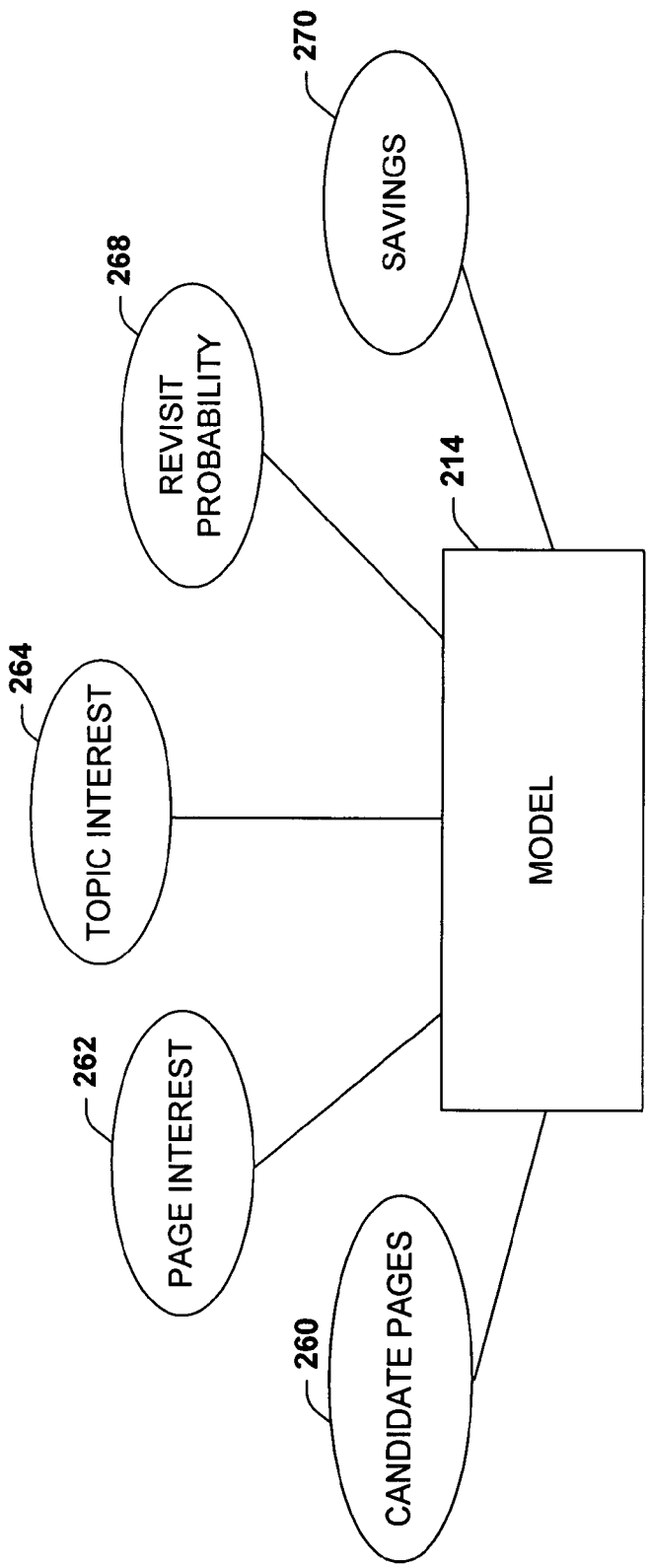
FIG. 4 is a diagram illustrating model components in accordance with an aspect of the present invention.

Referring briefly to FIG. 4, some exemplary aspects considered or employed in building the user model 214 are illustrated. At 260, candidate pages are analyzed, wherein the session analyzer 250 selects a set of pages that can appear on the user's montage. Generally, no upper limit is placed on the number of pages selected, however a minimum set of requirements can be set if desired for inclusion in this set such as a minimum number of times the user has ever viewed a given page. At 262, a user's interest in page is analyzed. In addition to employing URLs of candidate pages, estimates of the user's apparent interest in a page can be determined by analyzing the log 210 such as by how much time the user spent observing a page, how many links the user followed from the page, interactivity with a page and so forth. At 264, the user's interest in topic is determined. This can include modeling the user's interest in a higher-level topic of pages viewed. Thus, while the user may indicate relatively small amounts of interest in several different pages via time and site analysis of the log and associated topic analysis, the user may be more strongly interested in a single topic encompassing or describing the different pages. At 268 a probability of a site revisit is analyzed. This can include estimating a probability that a user will revisit a page in the next browsing session, given the user's current context. The session analyzer 250 mines this type of information from the user's page sequences and sessions captured in the log 210. At 270, savings estimates for navigation to a site are considered. These estimates can include the savings possible, in terms of time spent and the number of links followed to visit a recorded site in view of a determination made to place a page on the user's montage. One possible scenario favors suggesting information or content that may be difficult to revisit manually, because placing that content on the montage can save more navigation efforts for the user.

In addition to the processes described above in building and employing models, other aspects can be considered. This can include employing an automated topic classifier to identify the topic of pages and utilizing the topic and/or statistics on topic access as part of a definition of context. Thus, an inferred topic can be utilized in the construction of models and/or in association with real-time inferences of run-time models. The topic of a page being visited can be identified with an automated classification system that can be assembled via a probabilistic training procedure—including SVMs, Bayesian networks, regression models, and/or text-similarity, for example. At training time, a database of representative pages, that has been tagged and assigned to different categories in a topic ontology can be analyzed and a run-time model constructed. The run-time topic-classifier model analyzes the content and structure of pages and assigns respective pages a likelihood of being in an associated category represented in the ontology.

Referring back to FIG. 3, and after the model 214 has been substantially constructed, the montage 220 can be assembled via a display formatter 280 that employs the model. Because the montage 214 can depend on a user's current browsing context 282, a new montage page 220 or display can be created each time the user revisits his or her montage (e.g., select montage start or home button as a browser option, refresh action). The display formatter 280 includes a formatting component 284 that begins the assembly of the montage 220 by calculating an overall expected utility of viewing a respective candidate topic or a candidate page that has been selected by the model in view of the current user context 282. It is noted that the candidate pages or topics can also be selected by the model 214 without employing the context information 282, if desired. The formatting component 284 approximates the value of a page p to a user as a function of computed quantities defined as an interest, I(p), and a navigation savings derived by placing content or information on the montage, S(p).

In a general case, the utility of a page can be evaluated as some combination of these factors such as a function, $f(I(p), S(p))$. These factors can be treated as independent, wherein a weighted additive utility model and/or a weighted multiplicative utility model can be employed in the formatting component 284. As an example, a multiplicative model, weighted multiplicative model, and/or a weighted additive multiplicative model can be employed to determine the value of a page as illustrated in Equations 2, 3 and 4.

$$f(I(p),S(p))=I(p)^{k1}*S(p)^{k2};\quad\text{Equation 2:}$$

$$f(I(p),S(p))=I(p)^{k1}+S(p)^{k2};\text{ and/or}\quad\text{Equation 3:}$$

$$f(I),S(p))=k1*I)+k2*S).\quad\text{Equation 4:}$$

wherein k1 and k2 are constants.

It is noted that users can be provided controls in accordance with the graphical user interface described above that facilitates tailoring the combination function and/or weightings employed in the system and illustrated in part by Equations 2-4. For example, users can be provided with controls to adjust various weightings (constants or other parameters) with graphical sliders that can be labeled with relatively easy-to-understand descriptions of the influence of adjusting the controls in different directions.

If an assumption is made that the cost of serving content that is not desired by the user to be zero, then the expected utility of a page can be stated as a product of the probability that the user will visit a page p given a current context C, Pr(p|C), and the value of the page as expressed in Equations 2-4. Thus, the expected utility of a page can generally be expressed as:

$$E[U(p)]=Pr(p|C)*f(I(p),S(p));\quad\text{Equation 5:}$$

Thus, from Equations 2-4, $$E[U(p)]=Pr(p|C)*(I(p)^{k1}*S(p)^{k2});\quad\text{Equation 6:}$$

$$E[U(p)]=Pr(p|C)*(I(p)^{k1}+S(p)^{k2});\text{ and/or}\quad\text{Equation 7:}$$

$$E[U(p)]=Pr(p|C)*(k1*I(p)+k2*S(p));\quad\text{Equation 8:}$$

wherein k1 and k2 are constants.

Similarly, the expected utility of a topic T can be considered to be a product of the probability that the user will view any page with topic T in the current context, Pr(T|C), and thus, the user's interest in the topic can be expressed as:

$$E[U(T)]=Pr(T|C)I(T);\quad\text{Equation 9:}$$

It is noted that the formatting component 284 can compute the above equations and be employed in conjunction with a clipping component 290 (employed within, before, or after clipping component) in order to place content on the montage. This can be achieved by maximizing a total expected utility, subject to the sizes of a browser window or display and in relation to the size or amount of embedded content placed in the montage 220. As an example, a box fitting problem can be solved, wherein a box container is a display or browser window area and respective boxes in the display are candidate page or topics having associated sizes and utilities (e.g., summing the expected utilities calculated for respective candidate topics or pages to maximize the total expected utility for the selected set). In general, box fitting problems can be formulated as:

Given a container of extent W (width) and H (height) (display area); boxes b[i] each of size w[i] and h[i], and value (utility) u[i]; determine which boxes b[i] are to be placed in the container, and their respective arrangement in the container, so as to maximize the sum of the value of the included boxes and mitigating that the selected boxes generally do not extend beyond the size of the container. It is to be appreciated that other techniques can be employed such as a knapsack approach and/or other type geometric analysis for fitting/formatting clippings into the montage 220.

In another aspect of the present invention, tools can be provided to inspect and tune measures of interestingness and navigation savings via the user controls described above. In addition, users can provide feedback on a function for combining these factors. For example, for the multiplicative model described above, an assessment can occur from users relating to the relative weighting ascribed to candidate topic or page interestingness versus navigation savings. In one example, these factors can be set to be about equal and provided as fixed functions for interest and savings, although other weightings are possible.

In addition to a montage that embeds information content from distal pages, an alternative montage can be provided that contains links to content (e.g., hypertext links) and is described in more detail below. For this type display, the formatting component 284 can be configured to sort links by expected utility and savings for respective possible topics only, whereby there is substantially no embedded content or additional topic-specific pages. It is to be appreciated that a montage display can be a combination of embedded content and links to distal or remote pages as will be described in more detail below. As can be appreciated by observing the system 200 in FIG. 3, signals can be employed to facilitate data access between one or more of the components. For example, the signals can include a data packet to communicate data derived from a plurality of lens components associated with the clipping component 290, wherein the lens components are focused on selected portions of a plurality of probabilistically determined data sites 294.

Figure 5:
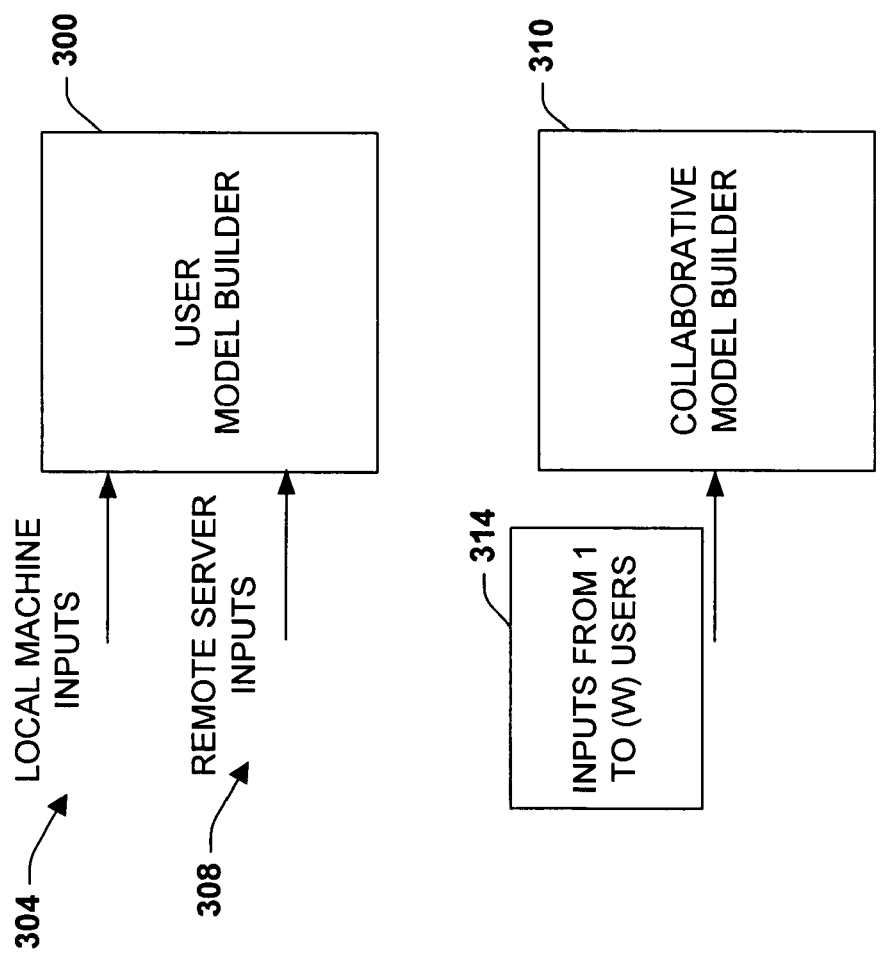
FIG. 5 is a diagram illustrating alternative model building architectures in accordance with an aspect of the present invention.

Referring now to FIG. 5, alternative model building approaches are described in accordance with an aspect of the present invention. A single model builder 300 is tailored/configured to a particular user's previous data site accesses as has been previously described. One or more proxies (not shown) can be configured to monitor such access and record this activity in a log within the model builder. For example, the proxies can be configured from user input activities from a local machine at 304, and/or the proxies can be configured and operate from inputs received from a remote server at 308 to monitor network or remote user activity.

In another aspect of the present invention, a collaborative model builder 310 can be created. The collaborative model builder 310 can be constructed from a plurality of inputs 314 (collected locally and/or remotely) that are provided from 1 to W users, W being an integer. According to this aspect, users belonging to a group, association and/or some other type of collaboration are monitored for previous data site activities. A log within the collaborative model builder 310 records these activities, wherein common site or topic activities are mined according to similarities between members of the users 314. One or more models can be constructed from the plurality of users 314 according to different context aspects that may pertain to and subsequently mined from members of the group. For example, one model may be constructed to provide a montage for new members that are added to the group reflecting previous data site activities for current members.

It is noted that collaborative modeling can be coupled with collaborative filtering methods that determine patterns of access of groups of people, and providing people with montages based on a suitable segment of users. For example, montages can be constructed of Human Resource pages (or other organization) on an Intranet, by determining which pages new employees tend to access over time, and then noting how long a new employee has been at a company and providing a suitable montage based on this time (e.g., showing the user items or content he or she may be searching for just before they begin searching for the content, providing a help page for utilizing productivity software, and so forth). Other collaborative determinations can include time on a project, level of expertise sensed by a plurality of processes, including answering a form about competencies and experiences, for example.

According to a different context (e.g., mining data at different times, dates, events according to similar patterns of access for members in relation to these contexts), other models can be constructed to drive a montage. As a particular example, new members to a project team may seek to access a plurality of common data sites in order to come up to speed on the underlying technologies involved in the project. Based on past access patterns of other newly added project team members, it can be determined and/or predicted how future team members may seek to acquire such information. Thus, a montage can be constructed from past data access patterns relating to team members that previously sought data to come up to speed and/or in a similar context. In another aspect, after a period of time has elapsed, date transpired and/or other different context (e.g., one year anniversary, holiday, national emergency event, company stock holders meeting), the collaborative model builder 310 can construct models that are mined from data according to the different contexts. In this manner, models can be constructed from collective data access patterns and context which can greatly facilitate productivity in an organization, whereby users can be provided a montage having information that is likely to be relevant to their current context based upon past histories of other users similarly situated. Thus, productivity and efficiency can be improved via a collaboratively built montage by mitigating the amount of searching and/or navigating members may have to perform to access desired information.

Figure 6:
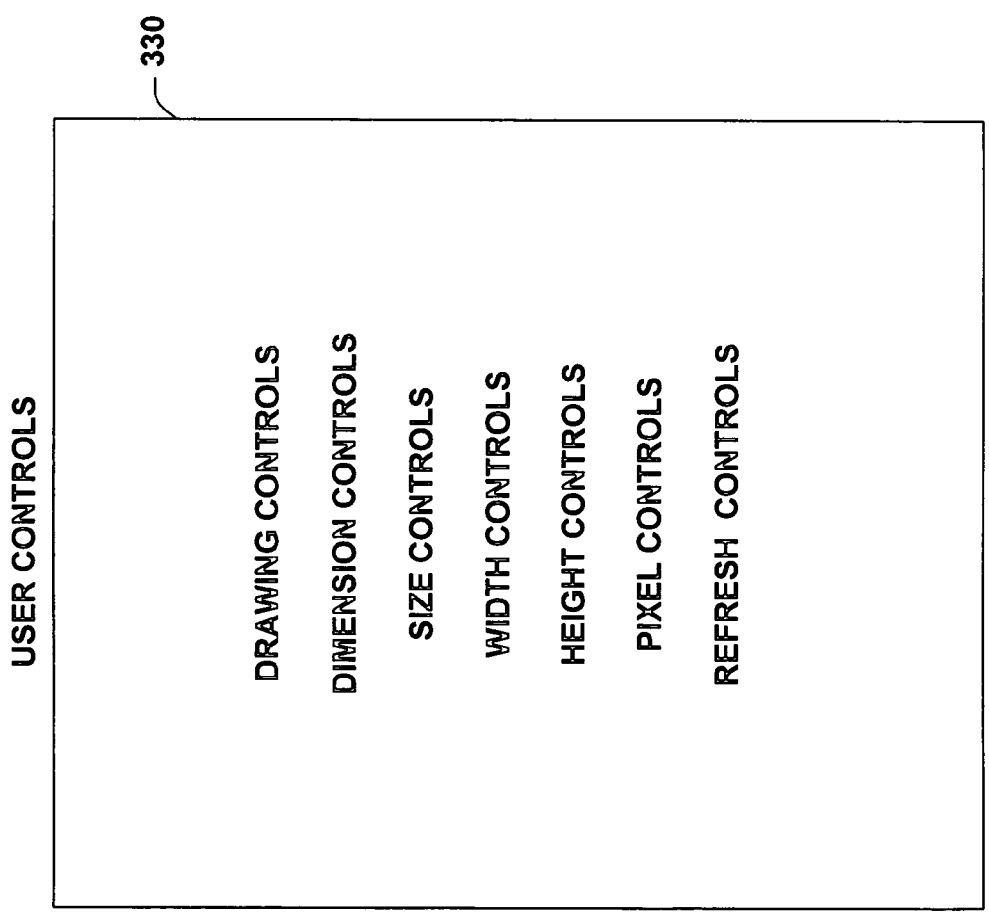
FIG. 6 is a diagram illustrating user controls in accordance with an aspect of the present invention.

Referring to FIG. 6, a user control component 330 is illustrated in accordance with an aspect of the present invention. The user controls component 330 includes a plurality of control inputs for controlling and/or configuring characteristics of the montage. As described above, these controls can be provided as part of a graphical user interface operative with the montage such as with menu options offered in a browser (not shown) and/or via display object inputs on or near the montage. As illustrated, the user controls 330 can include drawing controls for outlining shapes, dimension controls for altering multidimensional display objects or clippings, sizing and cropping controls, and display or clipping refresh controls. For example, these controls 330 can facilitate cropping a web page clipping such as a smaller window than the original site page to the montage. Users can also control the size and position on the distal page of the clipping as described above. By specifying the length, width, and focal point of the clipping, users create persistent lenses onto particular portions of the content of pages. Users can also dictate a frequency at which clipping content is refreshed. As an example, the user controls 330 can be configured such that if the user leaves their browser pointing at the montage, the montage can be automatically refreshed with embedded content at a default or configurable frequency or period setting.

Figure 7:
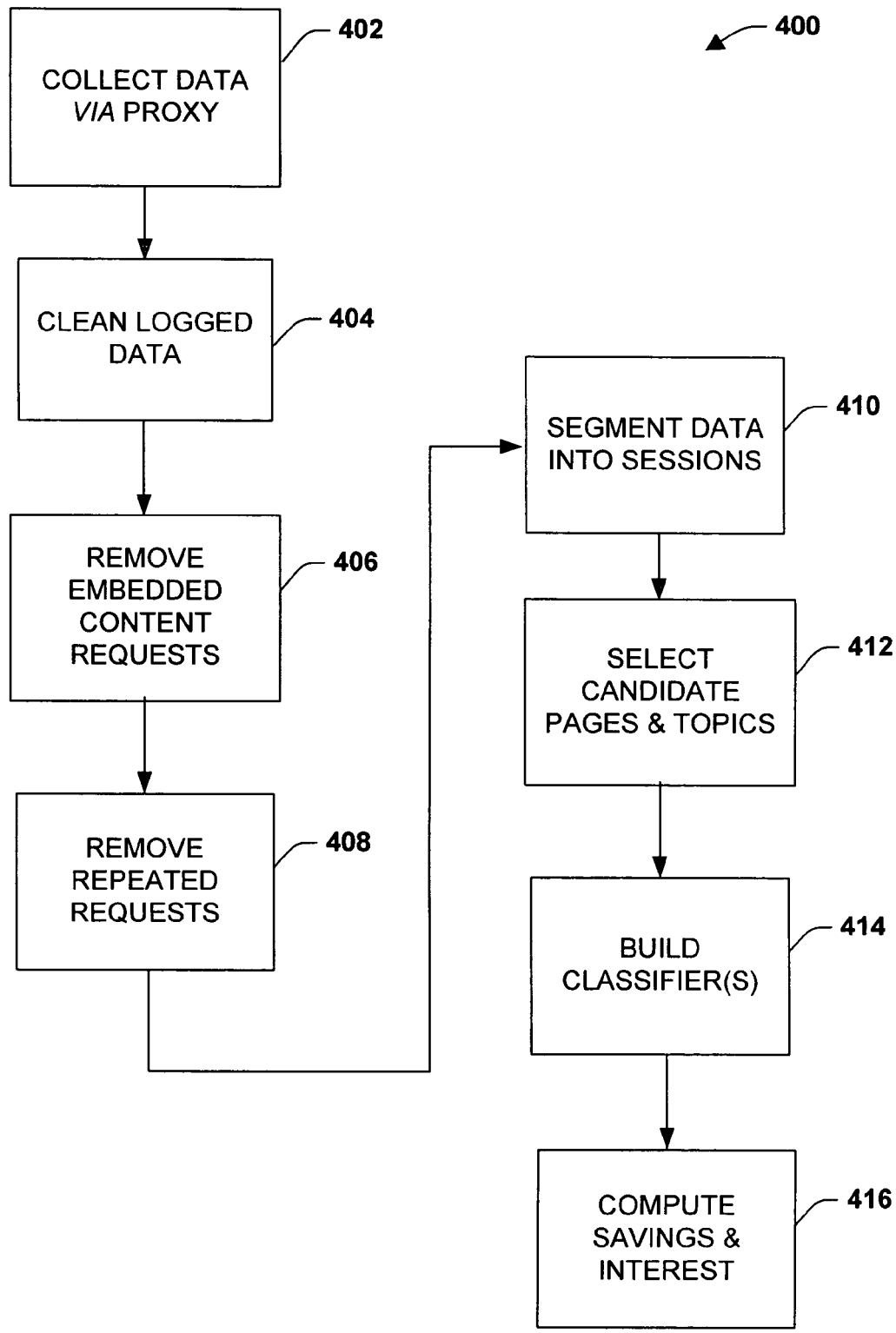
FIG. 7 is a flow diagram illustrating a methodology for model construction in accordance with an aspect of the present invention.
Figure 8:
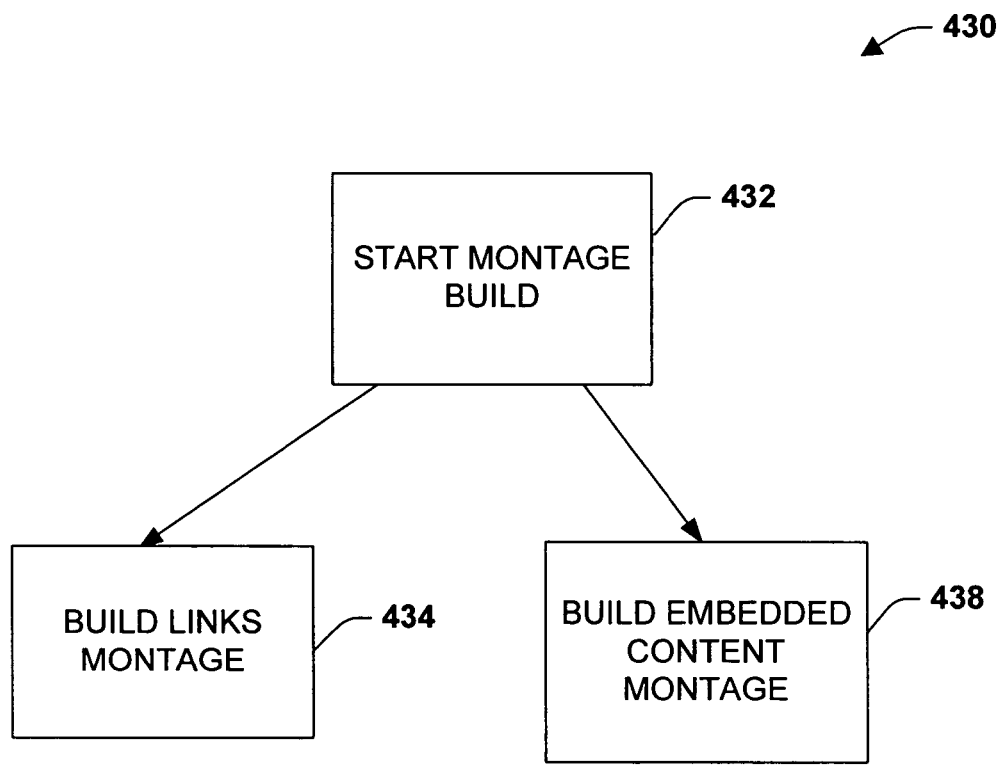
FIG. 8 is a flow diagram illustrating a methodology to display a montage in accordance with an aspect of the present invention.
Figure 9:
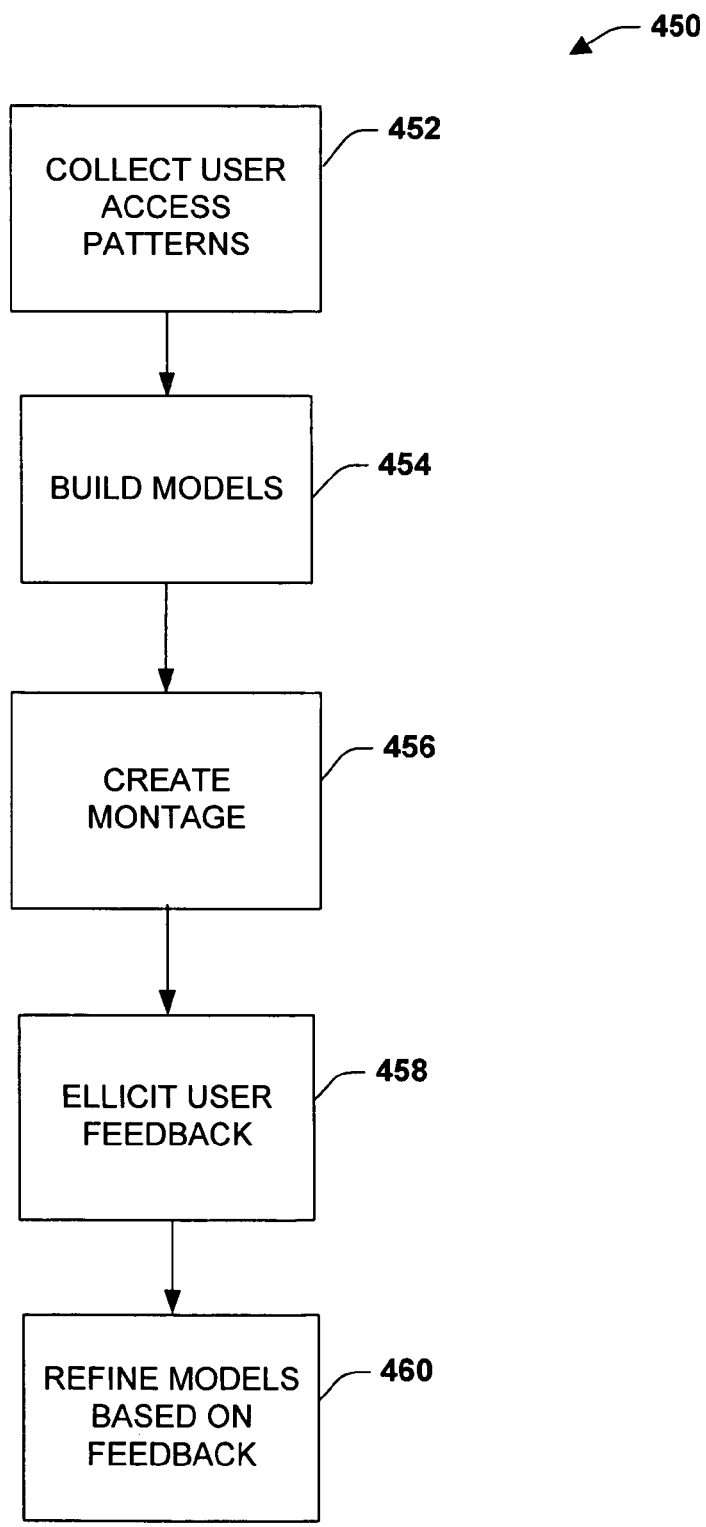
FIG. 9 is a flow diagram illustrating a methodology to employ feedback to refine a model in accordance with an aspect of the present invention.

FIGS. 7, 8 and 9 illustrate methodologies to facilitate information access in accordance with one particular aspect of the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 7 illustrates a process 400 for collecting data and mining models in accordance with an aspect of the present invention. At 402, users direct their web browsing or other data access activities through a proxy that, among other tasks logs data requests. Running the proxy on individual users' computers can be employed, although the present invention supports a single proxy running on a central server. An important advantage of the individual proxy relates to user privacy, wherein if the proxy and associated system operate on the user's computer, then the user can minimize the risk of sharing private information with third parties. Before mining user or collaborative access patterns, the logged data at 402 is cleaned at 404. This includes removing data requests at 406 for embedded web content (e.g., such as request for images embedded on pages, or frames in framesets) by parsing the HTML of requested pages and identifying which URLs are embedded. At 408, requests for pages that automatically refresh are removed (e.g., cnn.com automatically refreshes about every 30 minutes).

Request removal can be achieved by computing the statistical mode of the revisit interval for a URL and, if at least 10% of the intervals belong to the mode, removing requests that are made within a small tolerance set for the mode. This effectively removes the second, third, fourth, and so forth request for a page, but leaves the first request (the actual visit the user made) intact. At 410, a substantially final portion of the cleaning process segments the user access data into sessions—placing in the session requests made by following links from other requests in the session within a predetermined time window (e.g., 10 minutes) of the previous request.

With the proxy logs cleaned and sessionized, the process proceeds to select candidate pages and topics at 412. Substantially any page or topic that has been visited more than once, for example, can be a candidate for analysis. For respective candidates, a classifier is built at 414 (e.g., naive Bayes) to estimate the probability the user will view the page in a future context. The model classifies a session as to whether the user will view the page or topic in that session. Some possible evidential features employed by the model are: an overall rate with which the user views the page; a rate of viewing the page for respective 3-hour (or other intervals) blocks of time in a day (e.g., midnight-3:00 a.m., 3:00 a.m.-6:00 a.m., and so forth); and evidence of a predominant topic of the pages viewed during the last 4-hour (or other intervals) block of time.

At 416, navigation savings and/or user interest in a topic or site is determined. This includes savings that are possible when embedding a page on the montage and the user's interest in a page or topic. An estimation of the savings can be computed as the average number of links followed to reach a candidate page or site from the first page in respective sessions the candidate page or topic appears. The user's interest in a page, I(p), can be estimated heuristically, if desired, as a weighted sum of an average number of links followed from the page, L(p), and an average number of seconds spent in sessions starting with a page, D(p) and can be expressed as:

$$I(p)=L(p)*Constant_1(e.g., 0:50)+D(p)*Constant_2(e.g., 0:03);\qquad \text{Equation 10:}$$

wherein the constants can be selected to equate an average of two links followed from p with an average session time length of 30 seconds, for example. The user's interest I in a topic T is the sum of interest over substantially all pages whose topic is T and expressed as:

Equation 11:

$$I(T) = \sum_{p \in T} I(p);$$

FIG. 8 illustrates process 430 for displaying a montage in accordance with an aspect of the present invention. As the user's browsing context is potentially different when the user requests their montage, the montage may be rebuilt or refreshed frequently. For example, montages can be rebuilt and cached once per hour or other period if the set of features selected for a browsing context do not change faster than about once per hour or other period. Different visualizations for a montage can include an embedded-content montage, a links-only montage, and combinations thereof if desired.

At 432, a start montage build is initiated. At 434, a links-only montage is built and displayed. This can include creating a two-dimensional table containing links to web sites, for example. Link anchors or lenses can be selected as a target page's <title> or, lacking a title, a URL. At 438, an embedded content montage can be constructed. This can include forming as a set of nested <frame>s, wherein navigation bars, topic panes, and content panes within topic panes, are considered <frame>s. Hosting <frameset>s can be employed to specify the size of respective panes that facilitate setting the size of a cropping or clipping window for distal content, for example. To scroll the content to a suitable position on the distal page, the src of the frame can be set to a corresponding URL, and additionally adorns the URL with an associated tag the proxy intercepts. As noted above, the user can direct data access or browsing through a proxy—including requests made for content embedded on the montage. The proxy can pass the request along to a server (removing the adornment), and inserting a small amount of JavaScript into the resulting HTML stream sent back to the user. The proxy generally makes no other changes to the returned HTML, but the grafted JavaScript can be employed to scroll the page to a determined position for display as the page or clipping is loaded by the browser for display.

It is noted that an alternative approach can be employed to pass the URL directly to montage, fetch the page and modify the content without adorning URLs or intercepting requests with the proxy. However, because the URL the browser is exposed to is a montage page of collective clippings from a plurality of pages (e.g., virtual page constructed by the montage process and system described above), rather than an actual target site, the browser may not communicate associated cookies to a remote server. Thus, to facilitate the browser operating as if communicating with a remote site directly, the URL adornment approach described above can be selected.

After a montage page has been created the user may change the size and position of the cropping window on distal content by clicking a customize size & focus link in the upper-left corner (or other location) of any clipped content pane. The user can control various different aspects of how the content is displayed in the montage. For example, the user can directly change the size and position of a clipping window by changing the size and scroll position of the browser window. Dragging the window larger or smaller, and the clipping window becomes larger or smaller. In addition, the user can control how text flows on the page by specifying the width and height (in associated text or graphical input fields) of a virtual browser window the montage page is rendered in. For example, if the user wants to crop the content very narrowly, the user can specify the virtual browser to be a width or height of a specified amount of pixels for that page. Moreover, the user can control how often respective clippings reload in the browser window by setting a period, in seconds if desired, wherein zero seconds or other value can be employed to disable auto-refreshing.

FIG. 9 illustrates a methodology 450 for modeling data access patterns and refining associated models in accordance with user feedback. As noted above, users can direct their web browsing activities through a central proxy running on a server. At 452, user access patterns of sites normally visited are collected via the proxy. At 454, and after a predetermined period (e.g., 1 week) models for respective users are built (e.g., once per day). It is noted that although the user's browsing context changes relatively frequently, a predictive model for the user generally does not change that frequently because an additional hour or half-day of browsing typically does not change models substantially. During a second time interval (e.g., after a second week), montages are created for respective users at 456. User's can then employ the montage from their browser's start page. At 458, an additional pane or user input can be added to the montage to elicit feedback when the user views the montage. A rating system can then be employed such as how "pleased" the user was with the montage, ranging from 1 meaning "Not pleased at all" up to 7, "Very pleased" wherein other ratings are also possible. Based on the user feedback supplied at 460, the models built at 454 can be refined based on the feedback, to tailor future montage displays according to desires of a respective user. It is noted that the systems and methodologies previously described for creating montages can employ a web pre-fetching system to facilitate data download time, if desired.

Figure 10:
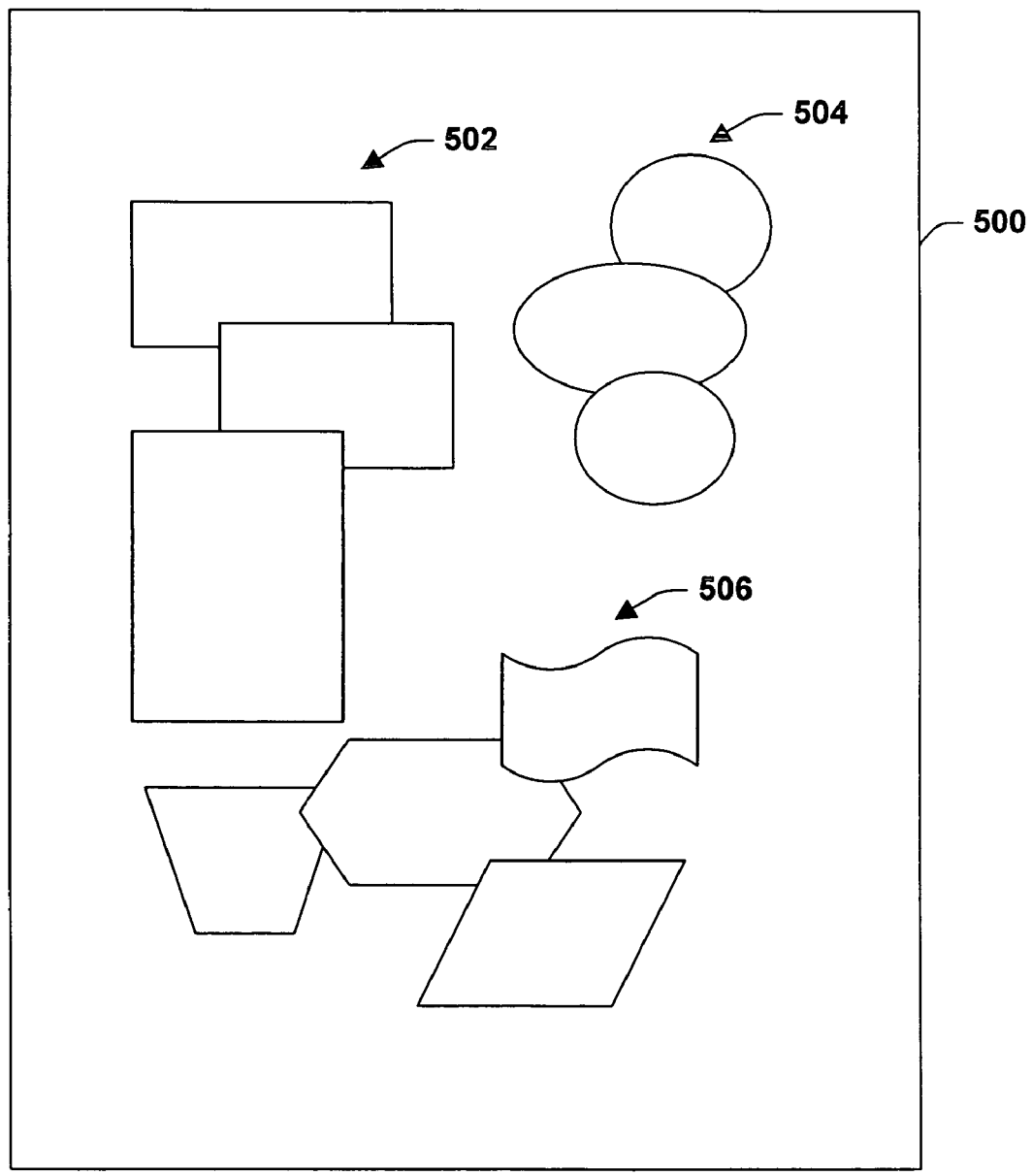
FIG. 10 is a diagram illustrating an overlapping display and shapes in accordance with an aspect of the present invention.

FIGS. 10-14 illustrate various display configurations in accordance with an aspect of the present invention. It is to be appreciated that the aspects depicted in the FIGS. 10-14 can be combined in a plurality of combinations. FIG. 10 illustrates an overlapping montage 500, wherein one or more clippings within the montage can be of substantially any size or shape and can touch or partially overlap. For example, a set of clippings at 502 is illustrated as overlapping rectangles, at 504, overlapping circles or ellipses are illustrated, and at 506 unrelated shapes are overlapped. As noted above, the clippings 502-506 can be updated via an associated lens and can be configured according to a plurality of geometrical patterns.

Figure 11:
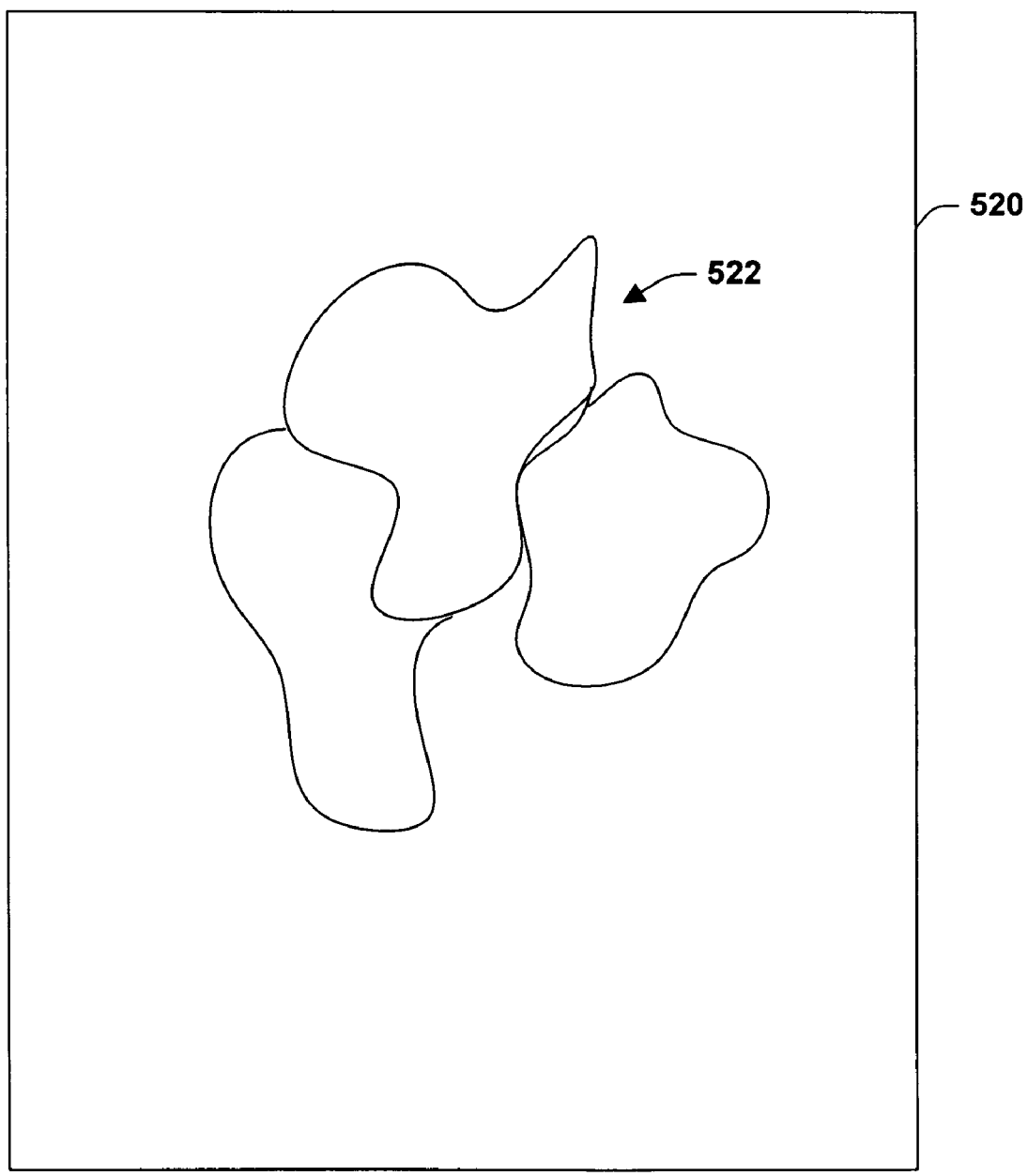
FIG. 11 is a diagram illustrating a collage display in accordance with an aspect of the present invention.

FIG. 11 illustrates a collage or puzzle type display 520. As an example, three shapes are illustrated at 522 that form a pattern or jig-saw type arrangement. The collage display 520 and associated shapes can be configured with a drawing tool that can be drawn via a user's mouse, for example. Coordinates from the drawing tool can be subsequently employed to extract selected data to fit about within the shapes at 522. It is to be appreciated that the shapes 522 can be touching, overlapping, and/or separated from other respective shapes.

Figure 12:
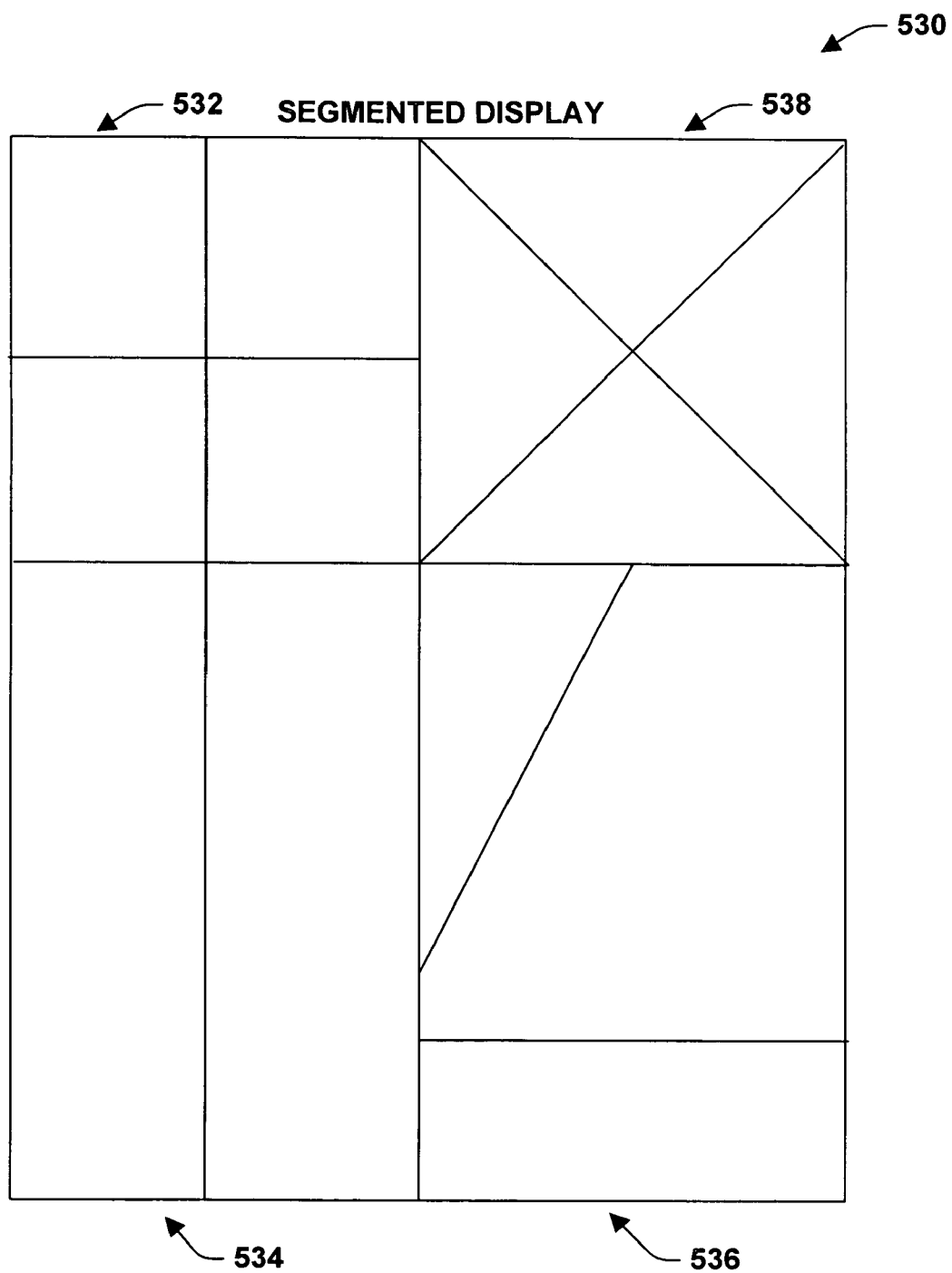
FIG. 12 is a diagram illustrating a segmented display in accordance with an aspect of the present invention.

FIG. 12 illustrates a segmented display 530. A portion 532 illustrates a quartered display, a portion 534 depicts a halved display, a portion 536 depicts a mixed portion display, and a portion 538 illustrates a diagonal or cross-sectioned display. As can be appreciated, a plurality of other fractional and/or geometrical segments can be realized in the display 530.

Figure 13:
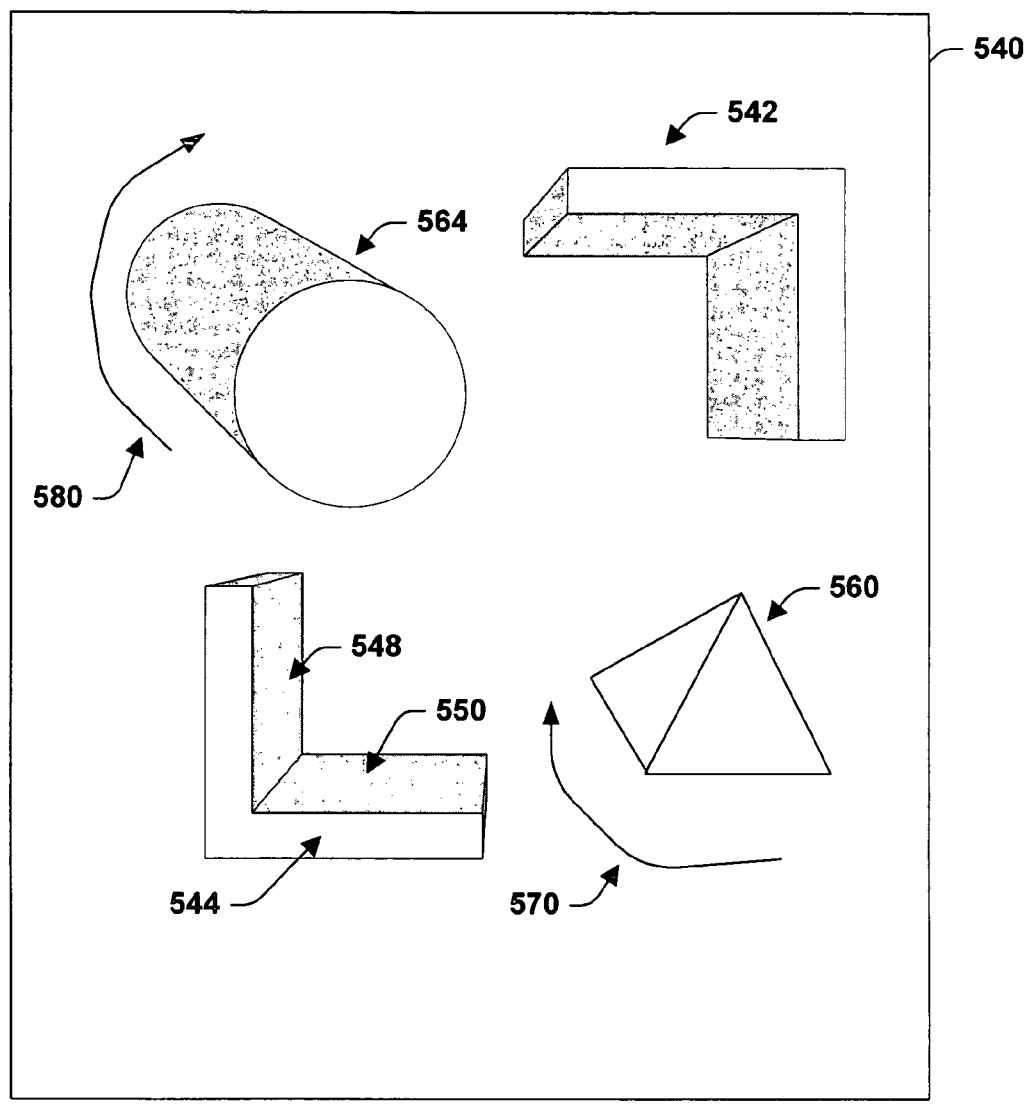
FIG. 13 is a diagram illustrating a higher dimensional display in accordance with an aspect of the present invention.

FIG. 13 illustrates a higher dimensional display. For example, wall components 542 and 544 (shown as wall portions) can display information in three dimensions such as at locations 546, 548 and 560. A pyramid 560 and a cylinder 564 illustrate higher dimension display objects that can provide information. As noted above, the objects 560 and 564 can be substantially any shape. Rotation arrows 570 and 580 illustrate possible rotation directions for the display objects 560 and 564. As described above, the display objects 560 and 564 can be configured to periodically rotate to display information from multiple dimensions over time.

Figure 14:
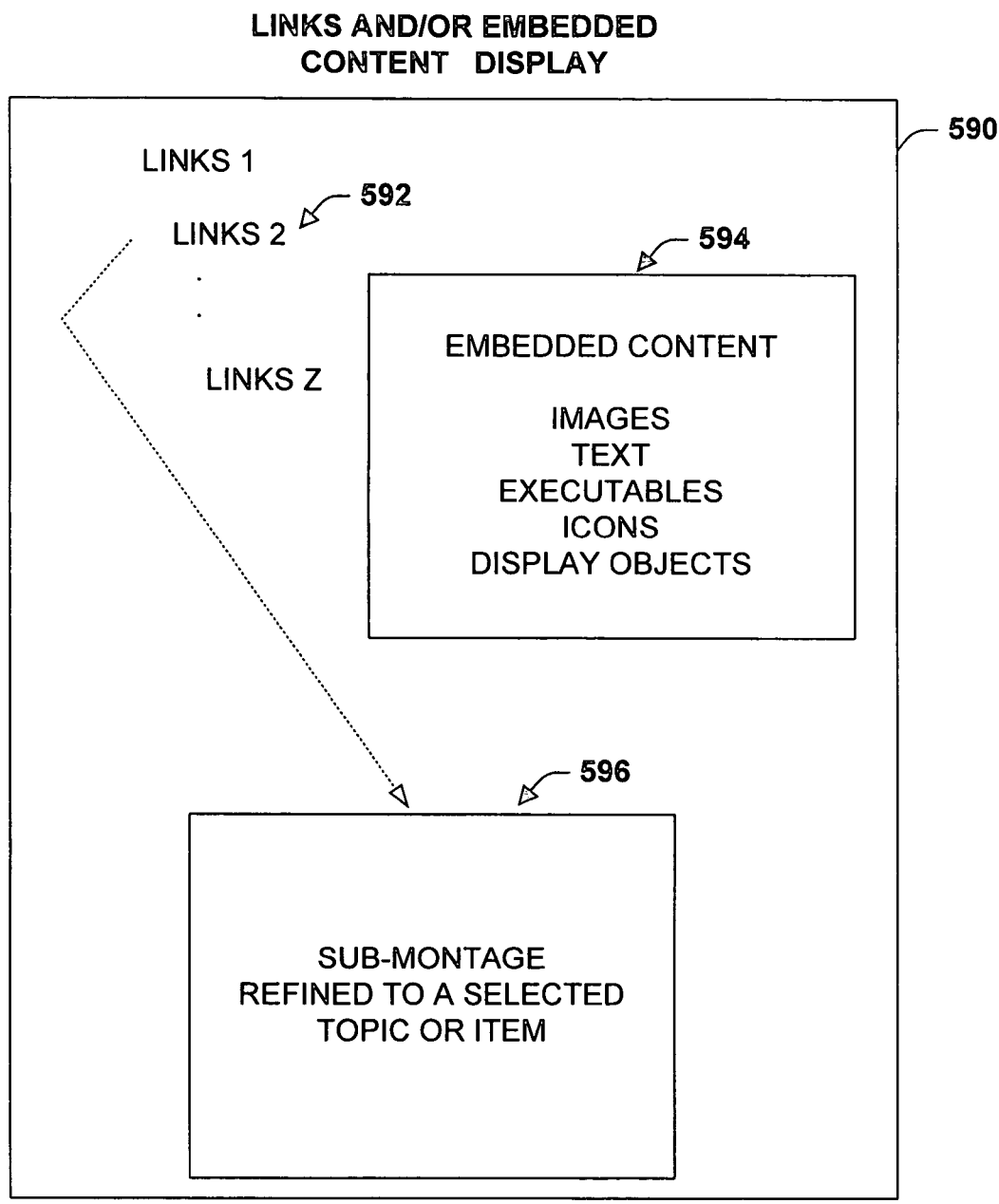
FIG. 14 is a diagram illustrating alternative displays in accordance with an aspect of the present invention.

FIG. 14 illustrates a links and/or an embedded content display 590. One or more links 592 can be provided on the display 590 to facilitate access to a site pointed to by the links. An embedded content portion or segment 594 can also be included in the display 590. The embedded content portion 594 can include substantially any type of data such as images, text, executables, icons, and/or other display objects. It is noted that if a link 592 is selected, a sub-montage 596 can be constructed and displayed. The sub-montage 596 can invoke other classifiers or models that are refined to a particular topic or area defined by the selected link 592.

In accordance with topic refinement and topic areas, automatic aspects are provided to control the level of a topic ontology that is employed in determining how to segment and display topic-specific/centric pages. This can include navigating to other levels in the ontology as a function of a user's interest and/or automatically controlling the breakdown of topics into subtopics, and providing more pages with finer-grained topics and/or changing the topics to finer or higher-level topic categories based on the amount of mined material over a certain level of user interest and/or overall expected utility determined within a higher level topic. Moreover, this can include providing a tree of topics and building separate pages for different high-level topics, wherein lower-level topics are represented on the display pages. Details of the lower level concepts and of the page segmentation/display itself can be computed with an automated classifier as described above.

Figure 15:
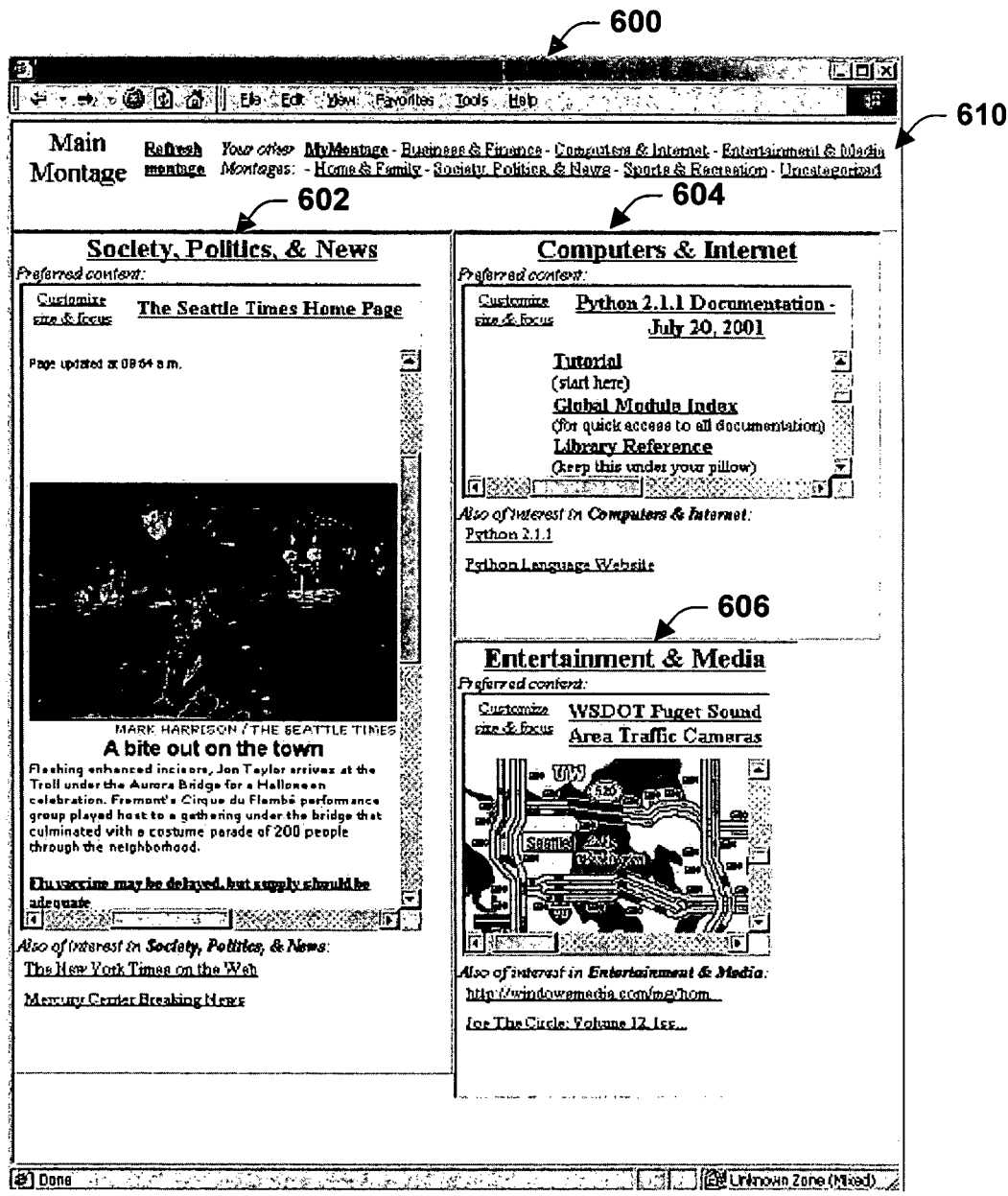
FIG. 15 is a diagram illustrating an exemplary montage in accordance with an aspect of the present invention.

FIGS. 15-18 illustrate exemplary montages that were constructed from an actual user's model. One example montage 600 is illustrated in FIG. 15. In this montage, three topic-specific panes are illustrated at 602, 604 and 606: one pane 602 relates to Society, Politics, & News, one pane 604 for Computers & Internet, and one pane for Entertainment & Media 606. It is to be appreciated that for a different user, the topics and the format of the display 600 can be constructed in a substantially different manner in accordance with the systems and methodologies previously described. In the panes 602-606, is embedded a cropped view of a distal web page as well as links to other pages of interest within the respective topic. Thus, a user can expediently view the afternoon's current news at 602, the user's most frequently-viewed programming documents at 604, and the current traffic conditions at 606.

Figure 16:
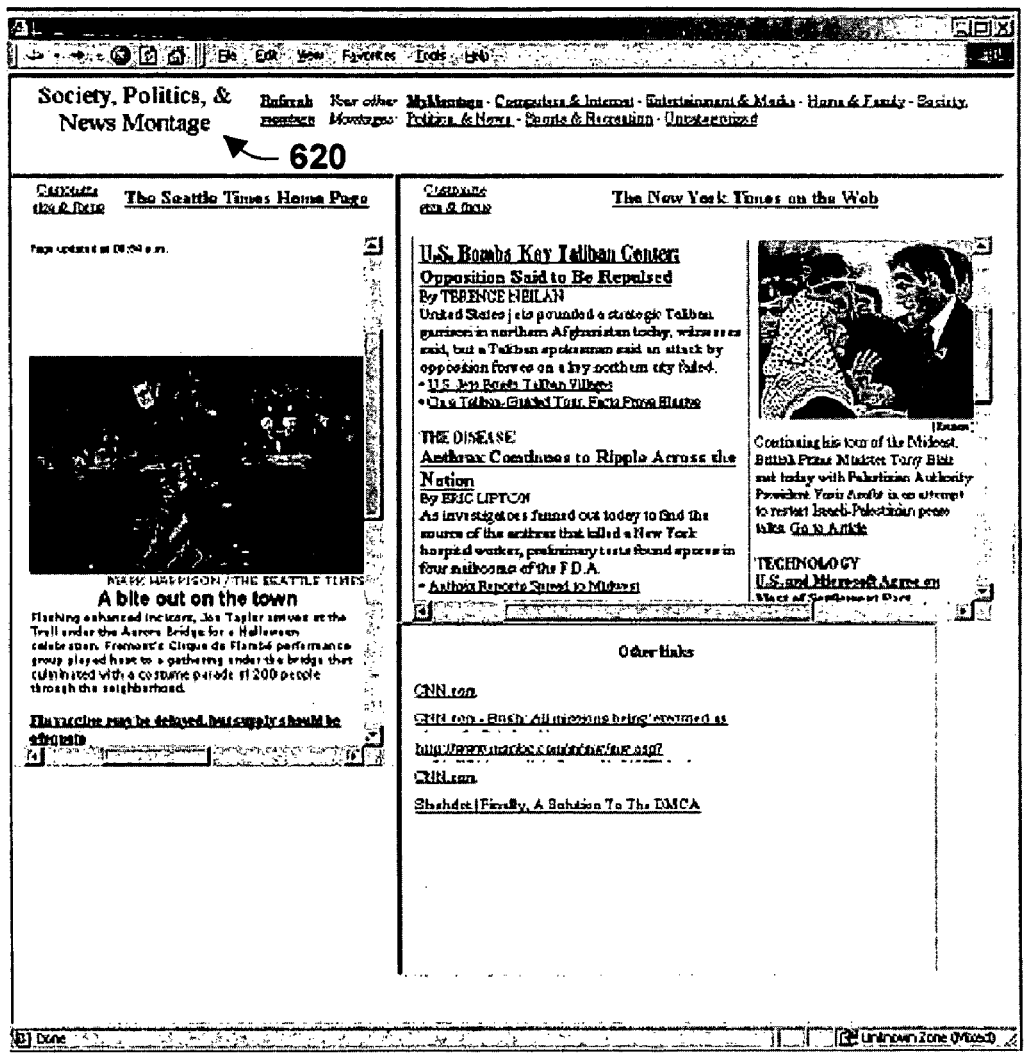
FIG. 16 is a diagram illustrating an exemplary sub-montage in accordance with an aspect of the present invention.
Figure 17:
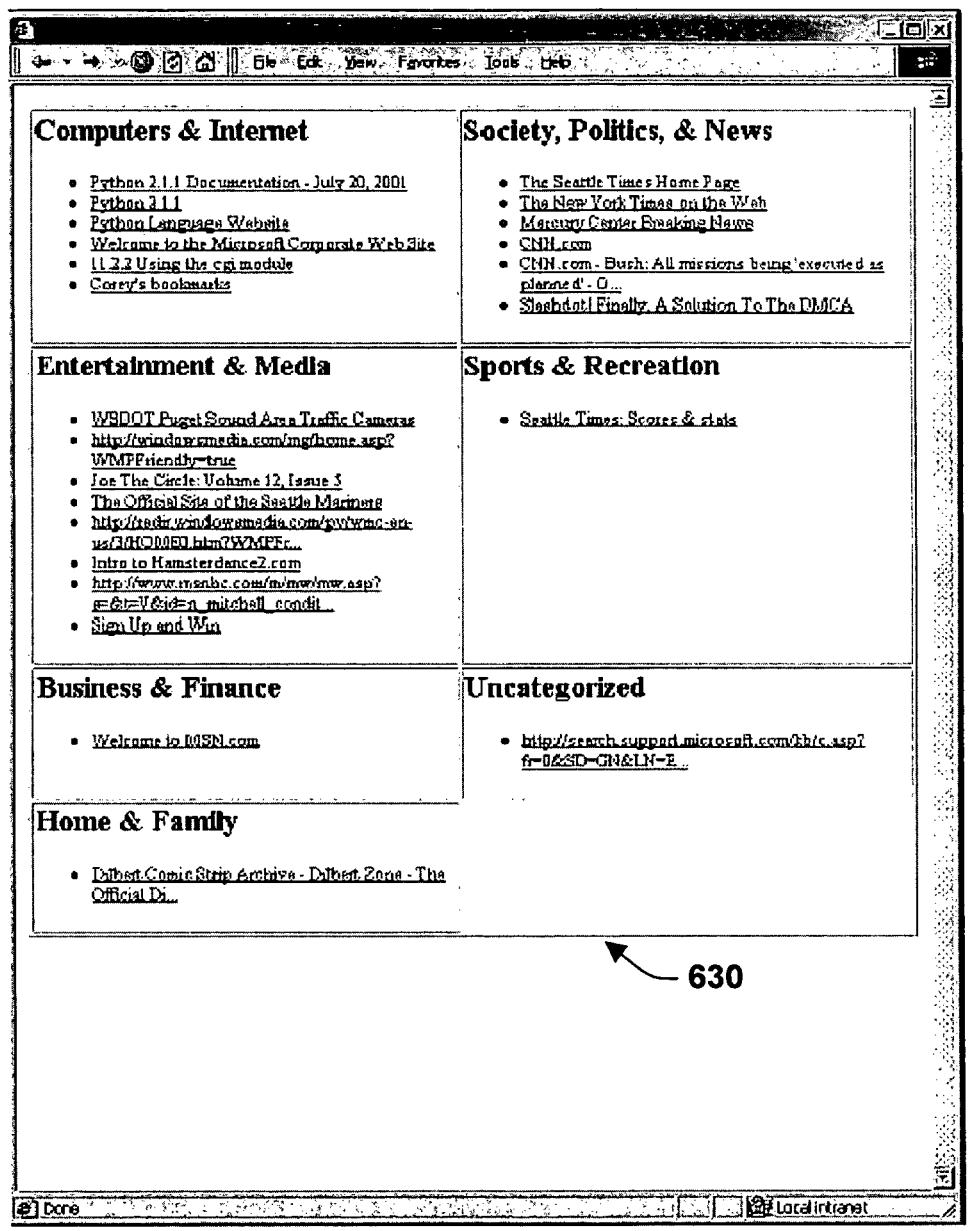
FIG. 17 is a diagram illustrating a links montage in accordance with an aspect of the present invention.
Figure 18:
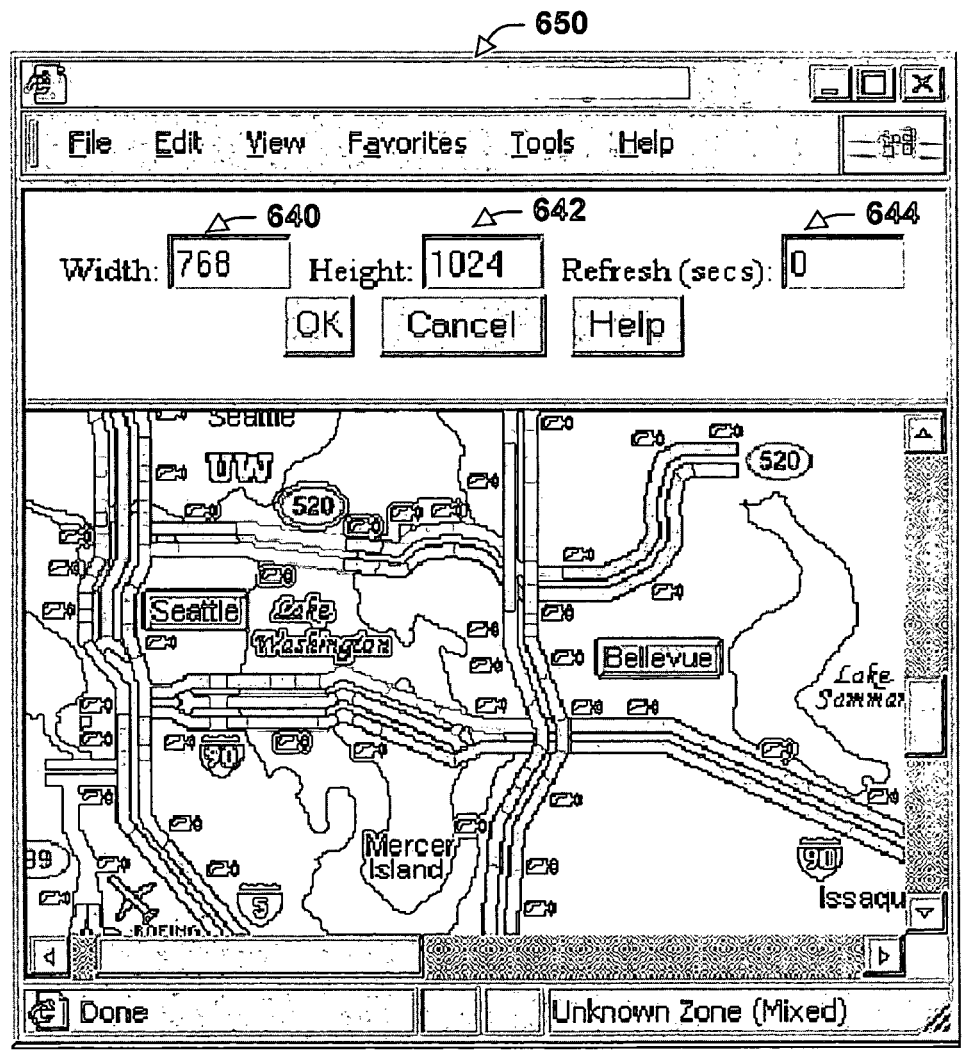
FIG. 18 is a diagram illustrating an exemplary user controls in accordance with an aspect of the present invention.

At the top of the page 600 appear links 610 to other, topic-specific montages that the user may be interested in as well. FIG. 16 illustrates a topic-specific or sub-montage 620. A topic-specific montage embeds several pages of content on the same or similar topics as well as a list of other interesting links. In this example, society, politics and news topic has been selected. FIG. 17 illustrates a links-only montage 630. As an alternative to the embedded-content montage, the links-only montage 630 displays links to distal content that can be employed to visit a selected site or topic. FIG. 18 illustrates user controls 640, 642, and 644 (e.g., width, height, refresh). In addition, users can change a cropping window 650 on the distal page by resizing and scrolling window (e.g., drag and drop action or height and width or pixel specification).

Figure 19:
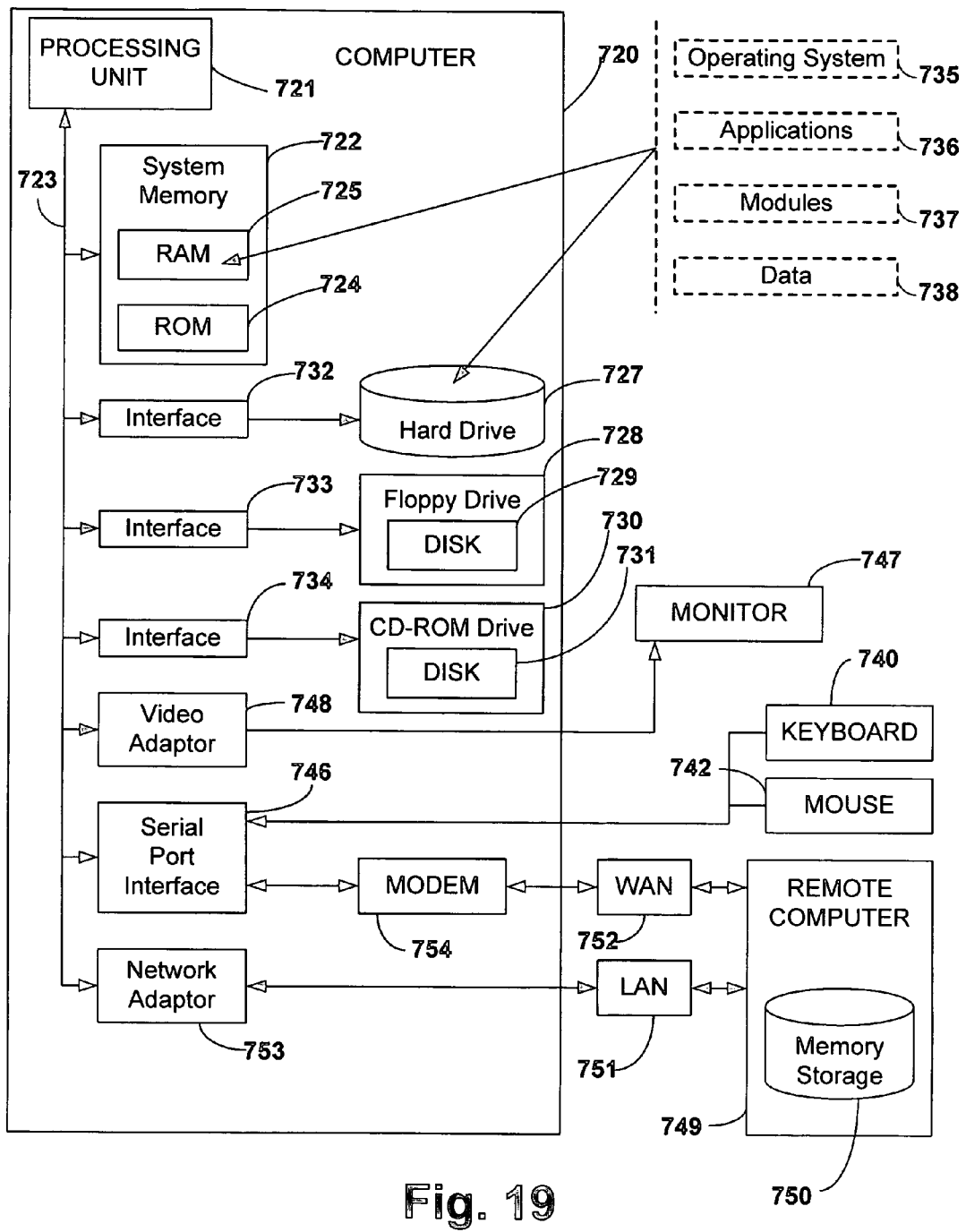
FIG. 19 is a schematic block diagram illustrating a suitable operating environment in accordance with an aspect of the present invention.

In order to provide a context for the various aspects of the invention, FIG. 19 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 19, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721.

The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system.

A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 19. The logical connections depicted in FIG. 19 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the local network 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A collaborative data access model system, comprising:
   a processor communicatively coupled to a system memory;
   a log that collects past data access patterns for a collaboration of users;
   a context component to record a plurality of contexts relating to the past data access patterns of a collaboration of users;
   a predictive component to determine future data access patterns relating to a newly added member of the collaboration of users at least in part on the past data access patterns of the existing collaboration of users at the time the existing collaboration of users were added to the collaboration of users and the context recorded; and
   a collaborative filtering component that determines patterns of data access of the existing collaboration of users within the existing collaboration of users and provides the existing collaboration of users with a montage based on a suitable segment of users within the existing collaboration of users, wherein the suitable segment of users within the existing collaboration of users is determined by:
   how long a particular user has been at an organization;
   how long the particular user has been on a project; and
   a level of expertise of the particular user, wherein the level of expertise is determined by the particular user answering a form about competencies and by recording an activity, wherein the activity includes using functions and completing a task.

2. The system of claim 1, further comprising the montage displaying clippings associated with a current context being related to the past data access patterns of the collaboration of users.

3. The system of claim 2, the current context includes information about at least one of a start time, a period of time that has elapsed since that start time, a date that has transpired, an anniversary, a holiday, an event and a meeting.

4. The system of claim 1, wherein the montage is provided as an organizational information page on an Intranet.

5. The system of claim 1, further comprising at least one of showing to a user of an existing collaboration content which the user is searching for just before the user begins searching for the content, and providing a help page for utilizing productivity software.

6. A collaborative data access model system, comprising:
   a processor communicatively coupled to a system memory;
   a log that collects past data access patterns for an existing collaboration of users;
   a context component to record a plurality of contexts relating to the past data access patterns of a collaboration of users, wherein each context relating to the past data access patterns of the collaboration of users is recorded at a distinct time period;

a predictive component to determine future data access patterns relating to a member of the collaboration of users based at least in part on the past data access patterns of the collaboration of users and the recorded context, wherein the predictive component more heavily weighs the recorded context recorded most recently in determining future data access patterns; and a collaborative filtering component that determines patterns of data access of the existing collaboration of users within the existing collaboration of users and provides the existing collaboration of users with a montage based on a suitable segment of users within the existing collaboration of users, wherein the suitable segment of users within the existing collaboration of users is determined by:

how long a particular user has been at an organization;

how long the particular user has been on a project; and a level of expertise of the particular user, wherein the level of expertise is determined by the particular user answering a form about competencies and by recording an activity, wherein the activity includes using functions and completing a task.

7. The system of claim 6, further comprising the montage displaying clippings associated with a current context related to the past data access patterns of the collaboration of users.

8. The system of claim 7, the current context includes information about at least one of a start time, a period of time that has elapsed Since that start time, a date that has transpired, an anniversary, a holiday, an event and a meeting.

9. The system of claim 6, at least one montage is provided as an organizational information page on an Intranet.

10. The system of claim 6, further comprising providing a help page for utilizing productivity software.

* * * * *

UNITED STATES PATENT AND TRADEMARK OFFICE
CERTIFICATE OF CORRECTION

PATENT NO. : 7,685,160 B2  
APPLICATION NO. : 11/191118  
DATED : March 23, 2010  
INVENTOR(S) : Eric Horvitz et al.

Page 1 of 1

It is certified that error appears in the above-identified patent and that said Letters Patent is hereby corrected as shown below:

In column 20, line 17, in Claim 1, delete "for a" and insert -- for an existing --, therefor.

In column 20, line 24, in Claim 1, after "users" insert -- based --.

In column 22, line 11, in Claim 8, delete "Since" and insert -- since --, therefor.

Signed and Sealed this
Twenty-fifth Day of January, 2011

David J. Kappos
*Director of the United States Patent and Trademark Office*